United States Patent
Vax et al.

(10) Patent No.: US 11,238,176 B1
(45) Date of Patent: Feb. 1, 2022

(54) SYSTEM AND METHODS FOR PRIVACY MANAGEMENT

(71) Applicant: BigID Inc., New York, NY (US)

(72) Inventors: Nimrod Vax, Tel Aviv (IL); Eyal Sacharov, Herzliya (IL); Dimitri Sirota, Mamaroneck, NY (US)

(73) Assignee: BigID Inc., New York, NY (US)

( * ) Notice: Subject to any disclaimer, the term of this patent is extended or adjusted under 35 U.S.C. 154(b) by 1171 days.

(21) Appl. No.: 15/626,258

(22) Filed: Jun. 19, 2017

Related U.S. Application Data

(60) Provisional application No. 62/351,911, filed on Jun. 17, 2016, provisional application No. 62/385,559, filed on Sep. 9, 2016, provisional application No. 62/404,264, filed on Oct. 5, 2016, provisional application No. 62/458,546, filed on Feb. 13, 2017.

(51) Int. Cl.
　　*G06F 21/62* (2013.01)
　　*G06F 16/2457* (2019.01)
　　*G06F 16/28* (2019.01)
　　*G06F 21/57* (2013.01)
　　*G06Q 30/02* (2012.01)

(52) U.S. Cl.
　　CPC ...... *G06F 21/6245* (2013.01); *G06F 16/2457* (2019.01); *G06F 16/285* (2019.01); *G06F 21/577* (2013.01); *G06Q 30/02* (2013.01)

(58) Field of Classification Search
　　CPC .............. G06F 21/6245; G06F 21/577; G06F 16/2457; G06F 16/285; G06Q 30/02
　　See application file for complete search history.

(56) References Cited

U.S. PATENT DOCUMENTS

| | | | |
|---|---|---|---|
| 9,501,744 B1* | 11/2016 | Brisebois | G06N 5/048 |
| 2011/0072486 A1 | 3/2011 | Hadar et al. | |
| 2011/0072487 A1 | 3/2011 | Hadar et al. | |
| 2012/0054213 A1* | 3/2012 | Puttaswamy | G06Q 30/0201 707/758 |
| 2013/0246342 A1* | 9/2013 | Faith | G06Q 30/06 707/607 |
| 2013/0318199 A1* | 11/2013 | Jouan | H04W 12/00502 709/217 |
| 2014/0188921 A1* | 7/2014 | Thomason | G06F 21/6245 707/758 |
| 2015/0215348 A1* | 7/2015 | Koeten | H04L 65/1073 709/225 |
| 2015/0365284 A1* | 12/2015 | Vigneras | G06F 9/54 709/223 |
| 2017/0024581 A1* | 1/2017 | Grubel | G06F 16/24578 |
| 2020/0050966 A1 | 2/2020 | Enuka et al. | |
| 2020/0311414 A1 | 10/2020 | Enuka et al. | |

* cited by examiner

*Primary Examiner* — Matthew Smithers
*Assistant Examiner* — Mirza Israr Javed
(74) *Attorney, Agent, or Firm* — Zeller IP Group, PLLC; Kyle M. Zeller

(57) ABSTRACT

Exemplary privacy management platforms are described herein. Such platforms may be embodied in systems, computer-implemented methods, apparatuses and/or software applications. The described privacy management platform may be configured to scan identity, primary and/or secondary data sources in order to provide users with visibility into stored personal information, risk associated with storing such information and usage activity relating to such information. The platform may correlate personal information to specific data subjects to provide an indexed inventory across multiple data sources.

18 Claims, 18 Drawing Sheets

FIG. 10

SYSTEM AND METHODS FOR PRIVACY MANAGEMENT

CROSS-REFERENCE TO RELATED APPLICATIONS

The present application claims benefit of U.S. provisional patent application Ser. No. 62/351,911, titled "System and Methods for Privacy Management," filed Jun. 17, 2016; U.S. provisional patent application Ser. No. 62/385,559, titled "System and Methods for Privacy Management," filed Sep. 9, 2016; U.S. provisional patent application Ser. No. 62/404,264, titled "System and Methods for Privacy Management," filed Oct. 5, 2016; and U.S. provisional patent application Ser. No. 62/458,546, titled "System and Methods for Privacy Management," filed Feb. 13, 2017. Each of the above applications is incorporated by reference herein in its entirety.

BACKGROUND

This specification relates generally to data discovery and protection. More specifically, this specification relates to systems and methods for discovering and protecting personal information stored in any number of data sources and for monitoring access of such information to manage customer privacy.

In the digital economy, preserving customer confidence and trust requires protecting their personal identity information from loss, theft and misuse. Information technology and the Internet have made it easier to steal such personal information through breaches of Internet security, network security and web browser security, leading to a profitable market in collecting and reselling personal information. Such personal information may also be exploited by criminals to stalk or steal the identity of a person, or to aid in the planning of criminal acts.

The primary challenge most organizations face today, as it relates data protection, is understanding where personal identity information is located across the organization's data centers. While there are a number of legacy data protection and data loss prevention ("DLP") solutions that attempt to address this issue, such applications typically employ classification algorithms based on regular expressions. Unfortunately, such solutions are not optimized to search for personal information specific to the customers of a given organization, cannot determine the identity of data subjects and cannot find contextual personal information.

There remains a need for data protection and customer privacy management systems that can identify customers and other data subjects relevant to an organization and employ such information to search for and classify sensitive data stored throughout an organization's various data systems. It would be beneficial if such systems could provide an organized inventory of any type of personal information, indexed by data subject, to facilitate management of data risk and customer privacy.

SUMMARY

In accordance with the foregoing objectives and others, exemplary privacy management platforms are described herein. Such platforms may be embodied in systems, computer-implemented methods, apparatuses and/or software applications. The described platforms may provide a privacy and data protection client application for monitoring and analyzing privacy information. For example, the platform may be configured to scan an organization's various systems and applications in order to provide users with visibility into any personal information that may be stored in such data sources, any associated risks associated with storing such information and/or any usage activity relating to such information.

Embodiments of the privacy management platform may provide a system to search for personal information across any number of local and/or cloud-based systems. Once potential personal information is found, the system may classify the information as personal information, based on stored and/or learned rules. The system may then correlate personal information to specific data subjects and/or provide an inventory of such information that may be used by an organization to conduct privacy impact assessments.

Exemplary privacy platforms provide a client application to allow users to interrogate and analyze discovered personal information to determine privacy risk and/or usage compliance to various regulations and/or customer consent. Such applications may help organizations understand and compare data risk based on factors, such as but not limited to, data sensitivity, residency, security and/or access. For example, the platform may include: data risk scoring capabilities, which provide static and/or dynamic risk measurement; modular risk models from groups like the National Institute of Standards and Technology ("NIST"); enterprise customizability; and/or operational recommendations for mitigation and assignment workflow. In certain embodiments, the platform may include natural language query capabilities and may additionally or alternatively provide reports (e.g., reports that can be shared with auditors and legal representatives).

In one embodiment, a computer-implemented method of locating personal information in a plurality of data sources and correlating the personal information to one or more data subjects is provided. The method may include searching, by a computer, a first data source; determining, by the computer, that the first data source contains first personal information, based on one or more personal information rules; correlating, by the computer, the first personal information to a data subject; creating, by the computer, a first personal information record corresponding to the first personal information and the data subject; searching, by the computer, a second data source; determining, by the computer, that the second data source contains second personal information, based on one or more of the personal information rules, correlating, by the computer, the second personal information to the data subject; creating, by the computer, a second personal information record corresponding to the second personal information and the data subject; associating, by the computer, the first personal information record and the second personal information record with a data subject profile corresponding to the data subject; and/or providing, by the computer, the data subject profile to a user.

In another embodiment, a system is provided. The system may include one or more computers and one or more storage devices storing instructions that, when executed by the one or more computers, may cause the one or more computers to perform operations including: searching a first data source; determining that the first data source contains first personal information, based on one or more personal information rules; correlating the first personal information to a data subject; creating a first personal information record corresponding to the first personal information and the data subject; searching a second data source; determining that the second data source contains second personal information, based on one or more of the personal information rules;

correlating the second personal information to the data subject; creating a second personal information record corresponding to the second personal information and the data subject; searching a second location of the second data source for personal information, based on one or more proximity rules; determining that the second location of the second data source includes third personal information, based on one or more of the personal information rules; correlating the third personal information to the data subject; creating a third personal information record corresponding to the third personal information and the data subject; associating the first personal information record, the second personal information record and the third personal information record with a data subject profile corresponding to the data subject; and/or providing the data subject profile to a user.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 10 shows an exemplary exploration screen.

DETAILED DESCRIPTION

Figure 1:
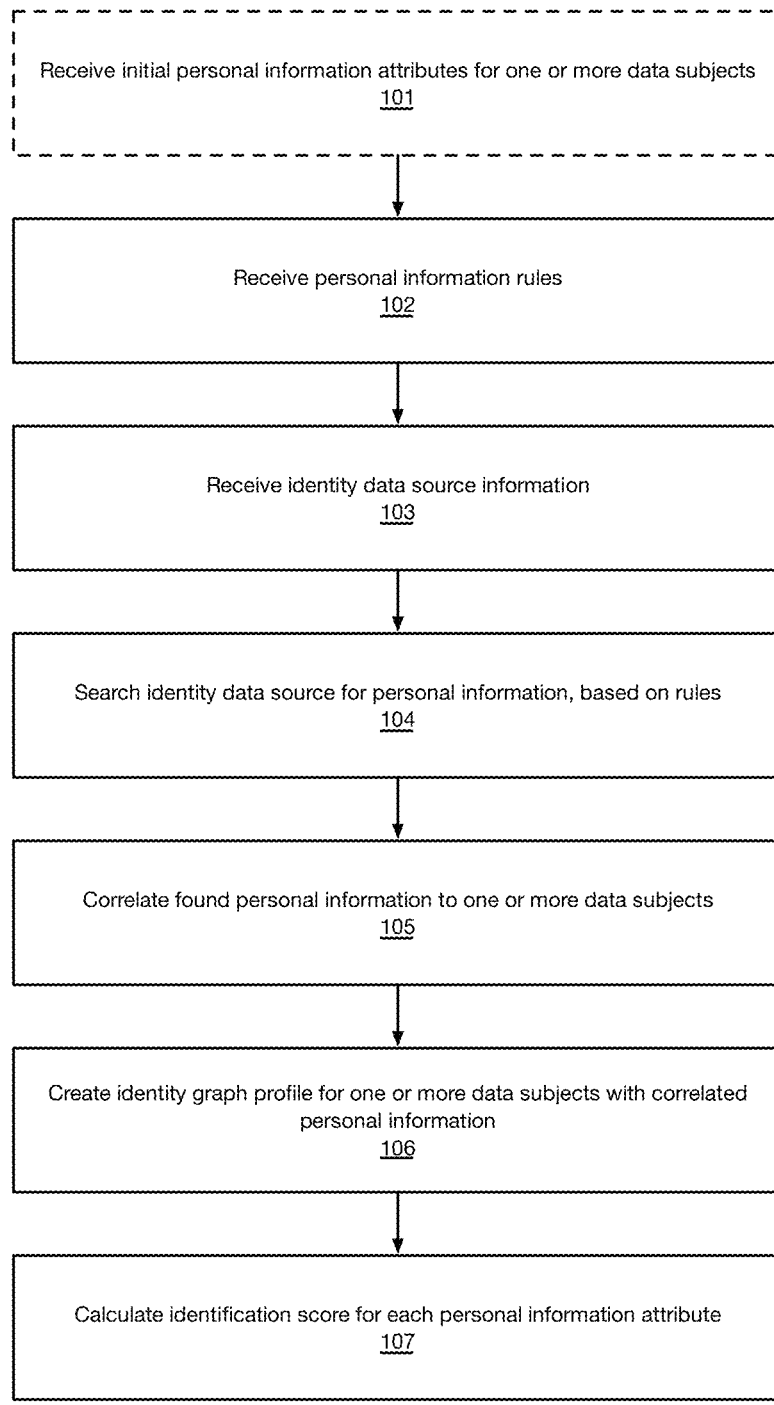
FIG. 1 shows an exemplary method of creating initial data subject profiles for an identity graph.

Various systems, computer-implemented methods, apparatuses and software applications are disclosed to allow organizations to discover, analyze, monitor and/or protect customer data and to manage customer privacy. The described embodiments may be adapted to scan an organization's various systems and applications in order to provide visibility into any sensitive customer data stored in such data sources, the risk associated with storing such data and/or any usage activity relating to such information.

The described embodiments may solve a number of issues that are not addressed by conventional data security systems, including but not limited to, assisting organizations to determine what data constitutes "personal information"; providing an organized inventory containing information pertaining to the location of personal information throughout an organization's systems (e.g., indexed by data subjects); allowing organizations to determine the residency of a data subject and to thereby understand the regulations with which it needs to comply; allowing organizations to determine which customers are impacted in the event of a breach or privacy violation; and/or providing functionality to allow organizations to comply with customer requests for deletion of such data.

Exemplary embodiments may be configured to determine what data constitutes personal information; determine one or more data subjects for whom personal information should be monitored; discover personal information stored throughout any number of data sources (e.g., on-premise and/or remote systems and applications); analyze and process discovered personal information to create a personal information inventory indexed by data subject; and/or provide monitoring and visualization of privacy and data security risks.

As used herein, the term "personal information" may refer to any information or data that can be used on its own or with other information to identify, contact, or locate a single person, and/or to identify an individual in context. Such information may include any information that can be used to distinguish or trace an individual's identity. Specific, non-limiting examples of personal information include, but are not limited to: name, home address, work address, email address, national identification number, social security number, passport number, driver's license number, age, gender, race, name of school attended, workplace name, grades, salary, job position, criminal record, web cookies, vehicle registration plate number, facial images or features, fingerprints, handwriting, IP address, credit card numbers, digital identity, login name, screen name, nickname, user handle, telephone number, date of birth, birthplace, and/or other genetic information.

Because of the versatility and power of modern re-identification algorithms, the absence of defined personal information does not mean that the remaining data does not identify individuals. While some attributes may be uniquely identifying on their own, any attribute can be identifying in combination with others. Accordingly, personal information may include any other information that is linked or linkable to an individual, such as medical information, personal health information ("PHI"), educational information, financial information, payment card industry ("PCI") data, employment information and/or other so-called "quasi-identifiers" or "pseudo-identifiers." Personal information may include information defined as "Personal Data" in Europe, or "Personally Identifiable Information," "PII" or "Sensitive Personal Information" (and other variants thereof) in the United States.

Referring to FIG. 1, an exemplary method of creating initial data subject profiles for an identity graph is illustrated. At an optional first step 101, initial personal information of one or more data subjects may be received by the system to create one or more data subject profiles. Such personal information (and resulting profiles) may correspond to users, customers, employees or any other person whose personal information is stored by the organization (collectively referred to herein as "data subjects"). Moreover, the initial personal information may be used as a learning set for the system to learn what personal information looks like in a specific environment. The initial personal information may be manually entered into the system by a user (e.g., via a client application) and/or may be included in a file that is uploaded to the system.

At step 102, the system receives one or more personal information rules. Such rules provide the logic required for the system to find personal information stored in various data sources. Personal information rules may include definition rules mapping to a unique identifier, a display name, country of resident attributes to be associated with specific personal information attributes (e.g., social security numbers or phone numbers) and/or combinations of such attributes. The personal information rules may further comprise one or more proximity rules governing searches within nearby locations of any found personal information attributes. For example, if a personal information attribute, such as a zip code, appears close to a social security number (e.g., in the same database row or within a certain number of characters), the system can correlate this proximity finding to a data subject associated with the given social security number.

In certain embodiments, the system may be preconfigured with a number of personal information rules. For example, the system may be deployed with attribute rules corresponding to the definition of personal information specified by one or more organizations, such as the definition(s) given by NIST Special Publication 800-122 (US) and/or General Data Protection Regulation (EU), both of which are incorporated by reference herein in their entirety. Additionally or alternatively, the system may be adapted to allow users to manually create and/or update personal information rules.

As discussed in detail below, the system may be configured to automatically update existing personal information rules and/or determine new rules. Exemplary systems may implement machine learning or similar techniques to iteratively and/or continuously create and update such rules.

At step 103, the system may be directed to identity data sources that are known to hold personal information of data subjects. Exemplary identity data sources may include, for example, structured databases, user directories (e.g., Lightweight Directory Access Protocol ("LDAP") directories), customer relationship management ("CRM") systems, human resources systems, ecommerce systems and others.

The system may determine and/or receive data source information associated with one or more identity data sources, such as a name, location, type and/or access information of the data source. In other embodiments, the system may receive data source information from a user. For example, a user may manually enter identity data source information into a client application and/or may upload a file containing such information. In another embodiment, the system may be configured to automatically discover one or more identity data sources, along with any corresponding data source information. The system may employ open source tools such as NMAP, Cacti, Nagios, Icinga, and others to perform data source discovery.

At step 104, the system may connect to one or more identity data sources and conduct a search for personal information contained therein, based on the stored personal information rules. As potential personal information attributes are found in an identity data source, the system may create a personal information findings list of such information, including the value of each attribute and/or attribute metadata, such as: the type of attribute found, the data source in which the attribute was found, the location where the attribute is located within the data source, and/or a date when the attribute was found.

Once the system has searched the identity data source and created a personal information findings file, the system may attempt to correlate each of the findings to a data subject 105. The correlation process may leverage open source tools such as, for example, OpenDLP, Weka, Orange, RapidMiner, etc. The correlation process is discussed in detail below with reference to FIG. 3.

At step 106, the system creates an initial identity graph data subject profile for any number of data subjects whose personal information is determined to be contained within the identity data sources. Generally, the system may create a unique profile for each data subject. And the system may associate any correlated personal information (and any corresponding metadata) with the relevant data subject profile. Collectively, the data subject profiles may be referred to herein as an "identity graph" and such identity graph may be stored and dynamically updated by the system.

In one embodiment, the identity graph may be designed to store pointers to personal information attributes (e.g., a secure hash used for search), rather than the personal information itself for privacy reasons. Accordingly, the system may not extract personal information from the original location where it is found.

The identity graph may allow a company to identify a unique data subject to whom stored personal information belongs. This is important for a number of reasons, including: determining access rights to user information; understanding user and data residency based on the residency of the data subject; containing breaches by identifying the impacted data subjects in the case of breach; and/or reducing false positives by correlating and validating the personal information with the data subject.

At step 107, the system may calculate an identification score for each personal information attribute added to each data subject profile. This score reflects the uniqueness of a single personal information attribute and/or for combinations of attributes in order to determine how strongly these attributes and combinations can be used to identify a particular data subject. The system may store the identification scores and may associate the same with a corresponding data subject profile. In certain embodiments, the system may additionally calculate a confidence level score relating to the confidence level of the accuracy of a personal information record. The confidence level score may be based on a heuristic calculation that takes into account the identifiability, correlation, distinct values, and/or distinct classification of the record.

Figure 2:
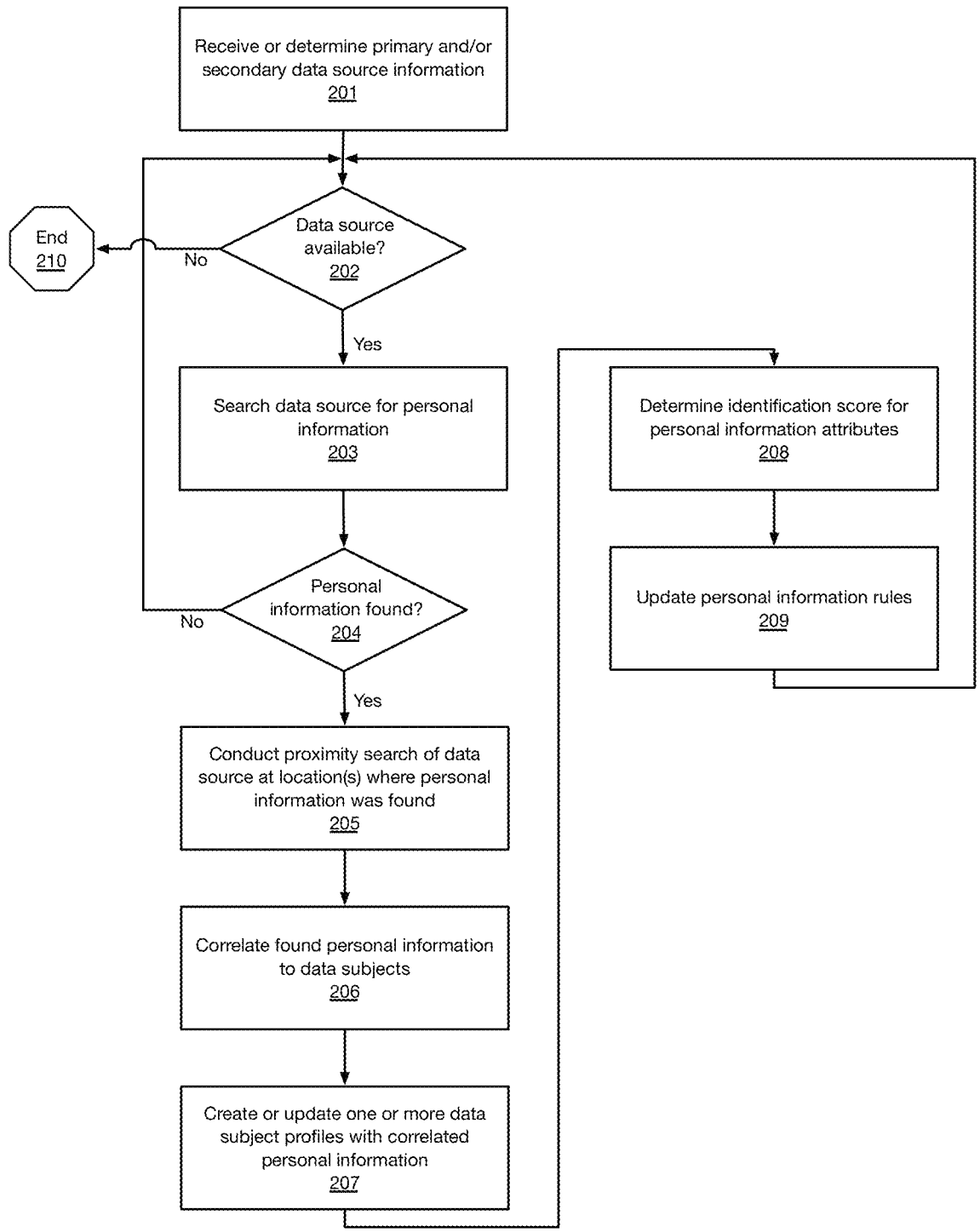
FIG. 2 shows an exemplary method of searching primary and secondary data sources for personal information to extend data subject profiles.

Referring to FIG. 2, an exemplary method of creating and updating data subject profiles for an identity graph is illustrated. Once the system is configured with initial data subject profiles (e.g., as described above with respect to FIG. 1), the system may update such profiles by conducting personal information searches of various primary and/or secondary data sources, such as databases, file shares and data protection solutions. Accordingly, the identity graph may be constructed to include an inventory of all personal information stored by an organization across various systems and applications, and each entry may include information such as, but not limited to: one or more stored attributes, a location of each attribute, application inventory, user store inventory, and/or all personal information attributes and application metadata (tags).

At a first step 201, the system receives and/or determines data source information corresponding to one or more primary and/or secondary data sources such that it may find, collect and/or determine the location of personal information within these data sources. Exemplary primary data sources may include, for example, structured databases (e.g., SQL), unstructured file shares, semi-structured Big Data and NoSQL repositories (e.g., Apache Hadoop, RDB and MongoDB), LDAP repositories, CRM systems (e.g., SALESFORCE), collaboration tools, cloud storage systems, text files and/or other internal or external applications. And exemplary secondary data sources may include, for example, DLP, data protection and/or data governance solutions (e.g., SYMANTEC, MCAFEE, VARONIS, IMPERVA, and IBM GUARDIUM) and/or log sources, such as but not limited to those of Security Information and Event Management ("SIEM") solutions (e.g., SPLUNK, HP ARCSIGHT, IBM QRADAR, etc.).

The system may be configured to automatically discover primary and/or secondary data sources, along with any data source information corresponding to such data sources. Additionally or alternatively, the system may receive data source information from a user via manual input or file upload.

At step 202 the system determines whether any discovered primary or secondary data sources have not been searched for personal information and/or whether such data sources have been updated since the last personal information search. If no such data source exists, the process may end 210. Otherwise, the process continues and the system searches a primary or secondary data source for personal information 203.

Generally, the system may search primary and secondary data sources for personal information attributes that have been previously associated with data subject profiles (i.e., that were added to the system by a user and/or that were found in identity data sources). The system may also search the primary and secondary data sources for additional personal information based on the personal information attribute rules.

At step 204, if no personal information is found during a search 203, the process may return to step 202 to determine whether any additional primary or secondary data sources are available for searching.

Otherwise, when personal information attributes are found, a proximity of such attributes (i.e., the "original attributes") may be searched 205 in order to identify any additional personal information attributes that are located close to the original attributes (i.e., the "proximate attributes"). Such proximity searches may be based on one or more of the stored personal information proximity rules and/or the attribute definition rules. And the proximity searches may be employed to find proximate attributes for any number of data subjects, whether or not they currently exist in the system (i.e., they need not be part of the original identity sources).

As discussed above, as potential personal information attribute are found in a data source, the system may add the finding to a personal information findings file along with any relevant metadata. Accordingly, the personal information findings file may comprise any number of personal information findings and metadata associated with such findings.

At step 206, the system attempts to correlate each of the personal information findings in the findings file to a data subject. As discussed in detail below with respect to FIG. 3, the system may create personal information records for each personal information finding that is successfully correlated to a data subject. Alternatively, the system may filter out certain findings before creating personal information records (e.g., false positives, findings correlated to multiple data subjects, findings with low attribute identifiability values, etc.).

The system may employ the results of the correlation (e.g., the personal information records) to create, update, delete and/or replace information stored in the data subject profiles within the identity graph 207. For example, if a personal information record corresponds to an existing data subject, such the records may be added to that data subject's profile. As another example, if a personal information record is correlated to a new data subject (i.e., a data subject who was not included in the identity data sources), a new profile may be created for the data subject and the personal information may be added to the new profile.

At step 208, the system may determine an identification score for one or more of the found personal information attributes correlated to each data subject profile. As discussed above, the system may store the identification scores and associate the same with a corresponding data subject profile.

At step 209, the system may update the personal information rules, including attribute definition rules and/or proximity rules. After determining the identifiability score of an attribute or combination of attributes, highly identifiable attributes or combinations of attributes can be used again iteratively to initiate new searches recursively. This allows the system to discover additional data sets (i.e., nodes in the identity graph) that are associated with the same identities.

As an another example, the rules may be updated to search for personal information belonging to any new data subjects discovered in the above steps. As yet another example, if a proximity search 205 resulted in the discovery of a proximate attribute, the location information of the proximate attribute may be used to update one or more personal information proximity rules so that subsequent searches may take advantage of this additional information. Generally, the location information may include, but is not limited to, the absolute location of the proximate attribute and/or the relative location of the proximate attribute to the original attribute. Additionally or alternatively, information relating to the type of proximate attribute may be used to update one or more attribute definition rules so that subsequent searches may look for this type of personal information.

In one embodiment, the system may employ machine learning techniques to iteratively update the personal information rules. One or more of the following machine learning algorithms may be employed: clustering, logistic regression, decision tree learning, Bayesian networks, random forests, support vector machine ("SVM") and/or artificial neural networks.

It will be appreciated that various machine learning algorithms provide different results for different types of data—structured or unstructured, text, documents, geolocation, images, etc. Moreover, the type and/or amount of stored data may vary widely among organizations. Accordingly, it may be preferable to continuously compare the results obtained by different machine learning algorithms on various data sources within a single organization and/or across multiple organizations to determine variance. To that end, the system may test training data and validate a plurality of algorithms to select the most effective for a particular data set and/or organization.

One or more of the above algorithms may be separately trained for each organization that uses the platform by employing organization-specific training data to build one or more organization-specific personal information classification functions comprising personal information attribute rules. An effective personal information classification function may then be employed for a specific organization, based on that organization's requirements or preferences.

Machine learning may also be employed to classify any proximate attributes found during a proximity search. Such classification may be based on whether proximate attributes are uniquely correlated to the data subject to whom the original attribute is correlated (i.e., based on identification scores of proximate attributes).

In one embodiment the system may employ a semi-supervised active learning process. For example, the system may use the following information as training data to train a machine learning algorithm to identify personal information (e.g., to create and/or update personal information rules): a first proximate attribute located within the proximity of an original attribute (e.g., collection of rows in a database or paragraphs in text files); the original attribute; and/or any other information associated with the data subject to whom the original attribute is correlated. The trained algorithm may then be used to determine whether each additional proximate attribute located within a proximity of the original attribute should be correlated to the data subject with whom the original attribute is associated.

In any event, once the personal information rules have been updated in step 209, the system may return to step 202 to determine whether any connected primary or secondary data sources have not been searched for personal information and/or whether such data sources have been updated since the last personal information search. If no such data source exists, the process ends 210. Otherwise, the process continues to search the next primary or secondary data source for personal information 203.

Figure 3:
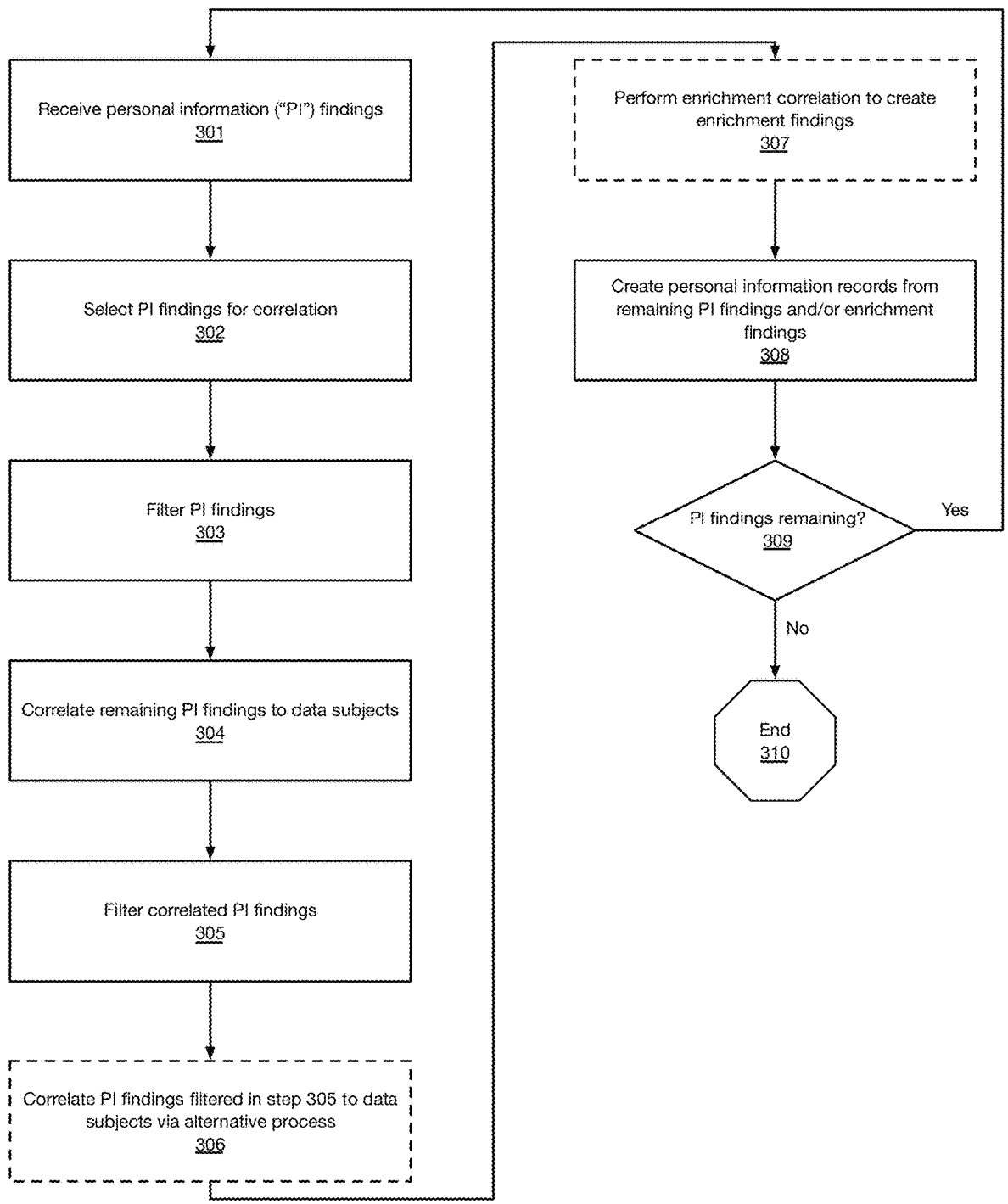
FIG. 3 shows an exemplary method of correlating personal information findings to data subject profiles.

Referring to FIG. 3 an exemplary method of correlating potential personal information found in a data source (i.e., personal information findings) to data subject profiles is illustrated. At step 301, the system receives one or more personal information findings for correlation. Such findings may be determined via a sample search or full search of an initial data source, a primary data source and/or a secondary data source.

In certain embodiments, all of the personal information findings associated with a scan of a data source may be stored in a personal information findings file or collection. Each of the findings may comprise metadata associated with the found potential personal information, including one or more of: an attribute type, an attribute value (which may be hashed for privacy reasons), a scan ID, a data source information corresponding to the data source where the attribute is stored (e.g., name, type, location, access credentials, etc.) and/or location information corresponding to a location within the data source where the attribute is stored (e.g., table, column, row, collection, etc.).

At step 302, the system selects a number of the available personal information findings to correlate. Correlation may be handled as a bulk process and the system may select all available findings, or may select a subset of such findings based on a user-configurable or system-determined variable.

At step 303, the system may filter out personal information findings associated with data values that should not be classified as personal information. In one embodiment, the system may filter out findings that are associated with a value that occurs many times within a given field in the data source that itself only contains a small number of distinct values.

For example, the system may filter out findings associated with a given value found in a data source field when: (1) the number of distinct values in the field divided by the total number of personal information findings found within the field is greater than a predetermined, configurable maximum (e.g., 0.001); and (2) the number of occurrences of the value in the field divided by the total number of personal information findings found within the field is greater than a predetermined, configurable maximum (e.g., 0.1).

Additionally or alternatively, the system may filter out finding that are associated with a value that occurs an abnormal number of times within a given field that itself only contains a small number of distinct values. For example, the system may filter out findings associated with a given value found in a data source field when: (1) the standard deviation of occurrences of the given value in the field ("stdDevPop") is greater than the average number of occurrences of all distinct values in the field; (2) the maximum number of occurrences of any distinct value in the field divided by the stdDevPop is greater than a predetermined, configurable maximum (e.g., 10); and (3) the number of occurrences of the given value in the field is greater than the average number of occurrences of all distinct values in the field plus twice the stdDevPop.

It will be appreciated that the above-described filtering techniques are merely exemplary and the system may employ any number of filtering processes to ensure that false-positive findings are not correlated to data subjects.

At step 304, the system attempts to correlate each of the remaining personal information findings (i.e., the findings that were not filtered out in step 303) to a data subject in the identity graph. In one embodiment, the system determines each of the data subject profiles to which a given finding's value maps and the total number such matches by, for example, comparing the finding's value to each of the personal information values stored in the identity graph (i.e., each value associated with each of the stored data subject profiles). Accordingly, it will be appreciated that a personal information finding may be said to "correlate" to a data subject profile when the value associated with the finding matches an attribute value associated with the data subject profile.

In one embodiment, the system may discard any personal information findings that cannot be mapped to any data subject attributes in step 304.

At step 305, the system may perform additional filtering on the personal information findings correlated to data subjects in step 304. For example, the system may filter findings that correlate to multiple data subject profiles and/or that only map to data subject attributes that fail to meet certain attribute identifiability criteria.

In one embodiment, the system may filter out personal information findings that correlate to more than a predetermined maximum number of data subject profiles. The predetermined maximum number of data subjects may be manually entered into the system by a user. Alternatively, this number may be automatically determined for a given finding's value by: (1) selecting an attribute with the lowest, valid attribute identifiability score (i.e., a score above an attribute identifiability threshold) and (2) calculating the sum of the average number of data subjects associated with the distinct value of the selected attribute plus the standard deviation of the average.

The system may additionally or alternatively filter out findings associated with values that only map to an attribute with an attribute identifiability score that is less than an attribute identifiability threshold. It will be appreciated that the attribute identifiability threshold may be manually entered by a user and/or may be automatically determined by the system. In one embodiment, the attribute identifiability threshold may be equal to about 0.5.

At optional step 306, the system may attempt to correlate each of the personal information findings that were filtered out at step 305 to a data subject profile via an alternative correlation process.

In one embodiment, the system may retrieve stored personal information records that were previously created from the data source associated with a given finding and within a proximity of the location where the finding was found (e.g., within the same table row in RDB or within the same document in MongoDB). The system may also identify all of data subject profiles that are associated with any personal information found in the proximity.

The system may then attempt to correlate the given finding to a data subject by comparing the finding's value to: (1) each of the values contained in the retrieved personal information record(s) and (2) each of the values associated with the each of the identified data subjects. The system may discard any personal information findings that cannot be mapped to any data subject profiles in step 306.

At optional step 307, the system may employ an enrichment correlation process. In one embodiment, the enrichment correlation process may be performed only when the personal information findings are associated with a structured data source. Additionally, the enrichment correlation may be performed only when the proportion between (1) the number of proximities in the data source (e.g., records in RDB, documents in MongoDB) with personal information records and (2) the total number of proximities in the data source (the "Proportion") is greater than a predetermined minimum value (e.g., 0.99). In one embodiment, the minimum value may be equal to 1−enrich_identify_range.

First, the system may determine a best column/field in the data source (a "best correlated column") corresponding to the column with: (1) the most personal information records, (2) the highest proportion between data subjects and personal information findings. The best column may be selected from among all columns in the data source where: (1) the number of corresponding personal information records is greater than half of the total number of records in the column and (2) the average number of data subjects matched to each corresponding personal information finding is less than 1+enrich_identify_range; and (3) the average number of data subjects matched to each corresponding proximity is less than 1+enrich_identify_range.

The system may then identify each of the columns/fields in the data source for which the number of corresponding personal information records is less than half of the total number of records ("enrichment columns"). Upon identifying the enrichment columns, the system may create enrichment findings corresponding to each of the values stored in each enrichment column.

In one embodiment, the system may combine any enrichment finding with a personal information finding associated with the same distinct value and field. The system may also filter out enrichment findings based on uniqueness. For example, the system may filter out enrichment findings for which the proportion between (1) the number of distinct values in the corresponding enrichment column and (2) the total number of records in the enrichment column is less than an a minimum value (e.g., an attribute identifiability threshold).

At step 308, the system may create a personal information record for each of the remaining personal information findings and/or enrichment findings correlated to a data subject. The remaining personal information findings may include (1) findings correlated to a data subject in step 304 and not filtered out in step 305; and (2) findings correlated to a data subject in step 306. It will be appreciated that each of the personal information records may include any of the data stored in the corresponding personal information finding and/or any of the information determined by the system in one or more of the above steps.

In one embodiment, the system may create personal information records for each of the remaining enrichment findings by joining an enrichment finding with personal information records on proximity where the field name is equal to the best correlated column and determining the data subject details from the matching personal information record.

At step 309, the system determines whether there are any additional personal information findings for which personal information records have not been created (or that have not been filtered out). If one or more of such findings exist, the process may return to step 302 to select additional findings. Otherwise, the process may end 310.

It will be appreciated that, in some embodiments, the system may skip any or all of processing steps 303 through 307. For example, the system may simply create a personal information record 307 for each of the personal information findings selected in step 302. This may preferably be employed when the personal information findings are associated with an identity data source.

Figure 4:
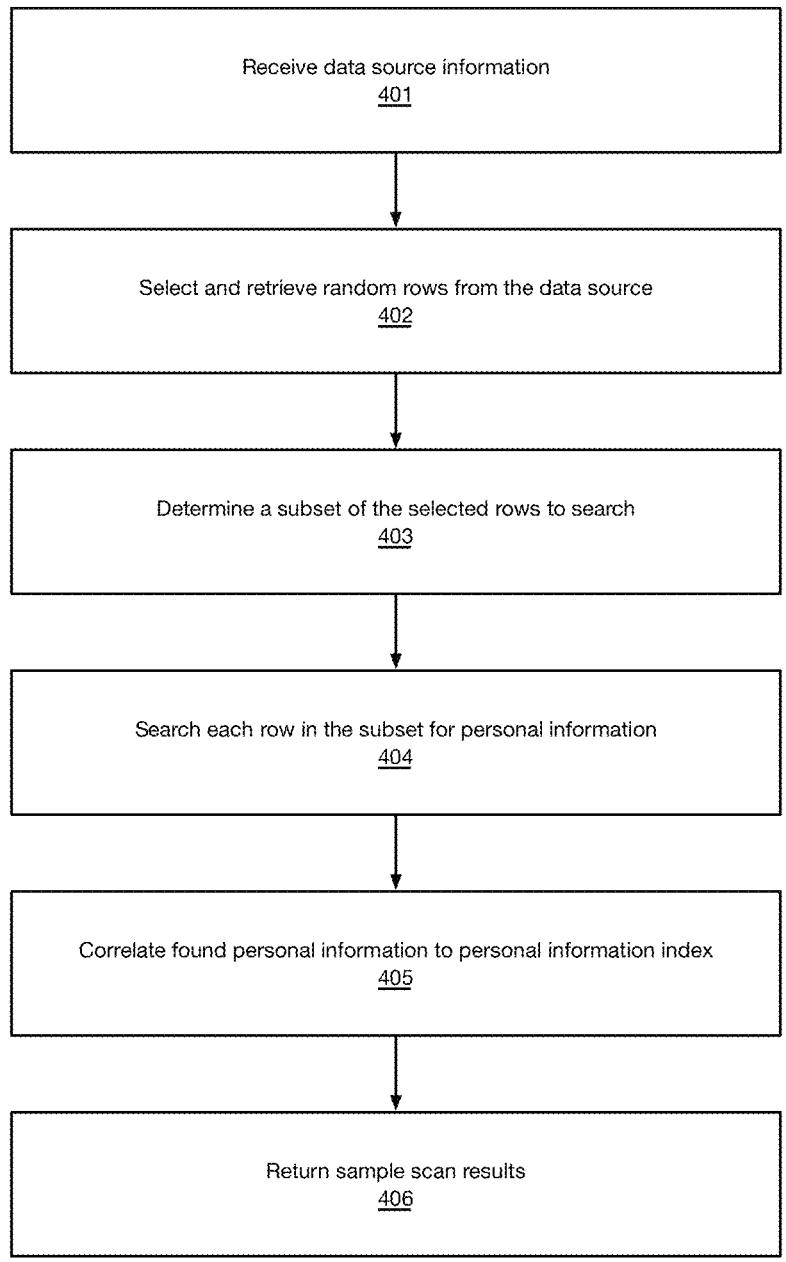
FIG. 4 shows an exemplary sample scan method.

Referring to FIG. 4, an exemplary sample scan method is illustrated. In certain embodiments, the system may employ one or more sampling methods to scan a configurable subset (or sample) of the data present in various data sources. Such sample scan techniques may provide a statistically-valid survey of the locations where personal information is stored, while significantly reducing search times and strain on the system.

Scanning data sources for personal information can be a lengthy operation, as a typical search includes such steps as: scanning all data present in a given data source (e.g., a table, collection, and/or file), fetching the data into a scanner, and then determining whether the data constitutes personal information (e.g., by checking the data against a personal information index). Moreover, a given search may discover a large number of personal information findings in cases where the data source is densely populated with personal information (e.g., several columns of personal information in each database row). Such a situation may adversely impact the speed of a scan process, because each finding may need to be fetched and correlated, even if the search ultimately results in the creation of only a small number of new records.

While some scenarios require a comprehensive search across all data sources in order to determine a complete description of all personal information belonging to each and every data subject in a system, this is not always required. Generally, exemplary sample scan techniques search only a subset of the data stored in one or more data sources across an organization. Such techniques are designed to maximize the probability of locating personal information, while maintaining a reasonably small sample size in order to reduce the amount of data that needs to be fetched and processed and the total time required to perform the search.

As shown in FIG. 4, at a first step 401, the system receives data source information corresponding to a data source on which a sample scan is to be performed. As discussed above, the data source information may be received from a user and/or may be automatically determined by the system via a discovery process.

At step 402, the system randomly selects and retrieves a number of rows from the data source. In one embodiment the number of rows to retrieve is predetermined (e.g., 1,000,000). In another embodiment, the number may be calculated by the system based on the total number of rows in the database.

At step 403, the system then selects a subset of the retrieved rows to search (e.g., about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23% 24% or about 25% of the total number of retrieved rows). In one embodiment, the selection of a subset of the retrieved rows may comprise random selection. In another embodiment, the subset may be selected by skipping a predetermined, calculated, or variable number of rows after each selected row until the desired number of retrieved rows are selected. Additionally or alternatively, any number of queries comprising skip and/or limit flags may be employed to determine which records to select within retrieved records of a data source.

At step 404, the system searches the selected subset of rows and creates a personal information findings file comprising personal information findings, as described above. The system then attempts to match each of the personal information findings to known attribute values stored in the system (i.e., to a personal information index) 405 to determine whether personal information exists in the data source.

At step 406, the system returns the results of the sample scan, including location information corresponding to one or more locations in the data source where personal information has been confirmed to exist (via step 405). The sample scan results may include metadata, such as but not limited to: data source information corresponding to the tables that were scanned, the number of rows scanned, the specific rows scanned, the number of findings detected, correlated personal information and/or other information.

The sample scan results may be employed for any number of potential use cases, as such results provide a basis for a quick analysis of personal information instances in target systems. As one example, sample scan results may provide strong value (and fast turnaround times) to an organization undergoing data center migration, where data subject correlation is not required. As another example, an initial sample scan may be employed to determine one or more locations within a data source where personal information is stored (e.g., tables/collections and/or specific columns within such objects).

In one embodiment, the sample scan results may be employed to run full scans only on data sources and/or locations within data sources that are determined to hold personal information. This may significantly reduce search times in situations where a data source comprises a large number of tables, but only a few of those tables contain personal information. By employing sample scans, the system may run full scans in a "just-in-time" fashion (e.g., when one or more users request that their data be removed from the system).

It will be appreciated that sample scan techniques may be employed to search structured data sources, including identity data sources, primary data sources and/or secondary data sources. It will be further appreciated that sample scan techniques may also be employed to search any unstructured data sources. Due to the variable nature of unstructured data sources, sample scan techniques may employ a mix of scanning entire files out of a sample group of files and/or sampling a subset of all files according to the methods described above.

Figure 5:
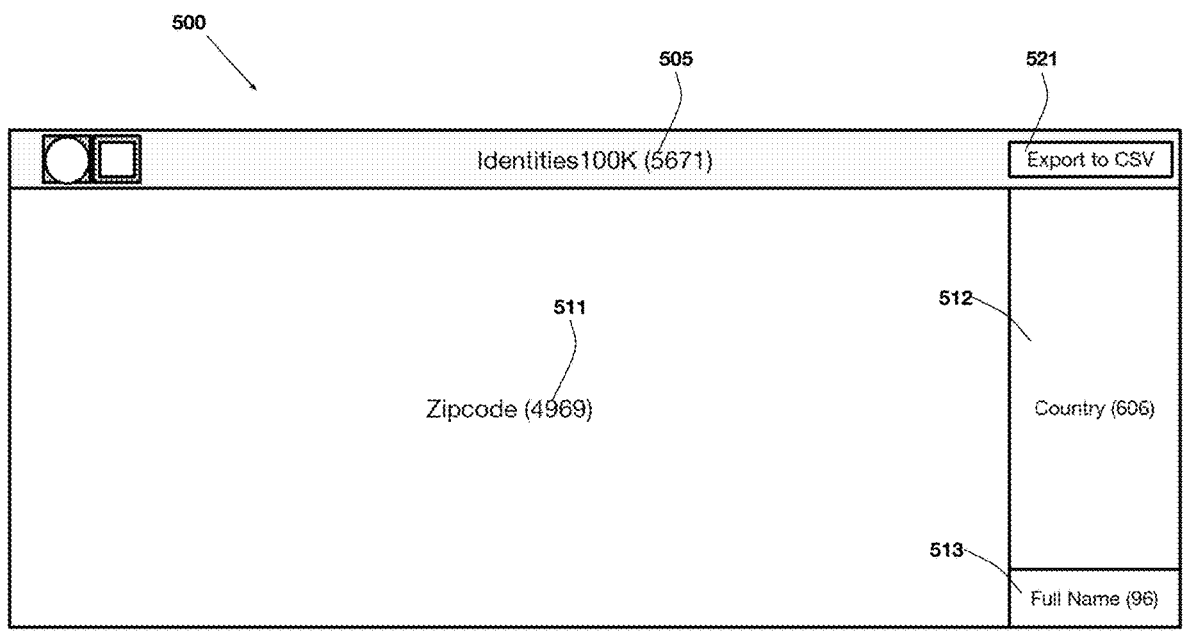
FIG. 5 shows an exemplary scan results heat map screen.

Referring to FIG. 5, in one embodiment, the sample scan results (and/or full scan results) may be presented in the form of a heat map report 500 accessible by one or more users of the system (e.g., via a client application). As shown, the heat map may display the number of data subjects 505 associated with personal information found in the scanned data source, along with the total number of each personal information attribute type found within the data source (e.g., zip code 511, country 512 and full name 513). The heat map may further display an option to export the data 521, for example to a CSV file.

Generally, the heat map 500 may allow users to drill down from top level data sources (e.g., data center endpoints and/or cloud storage systems) to a column level view. This has benefits in multiple use cases, including cloud migrations where assessment of server data sensitivity is essential, as well as developer environments where data stores and microservices should be monitored for potential personal information contamination.

Figure 6:
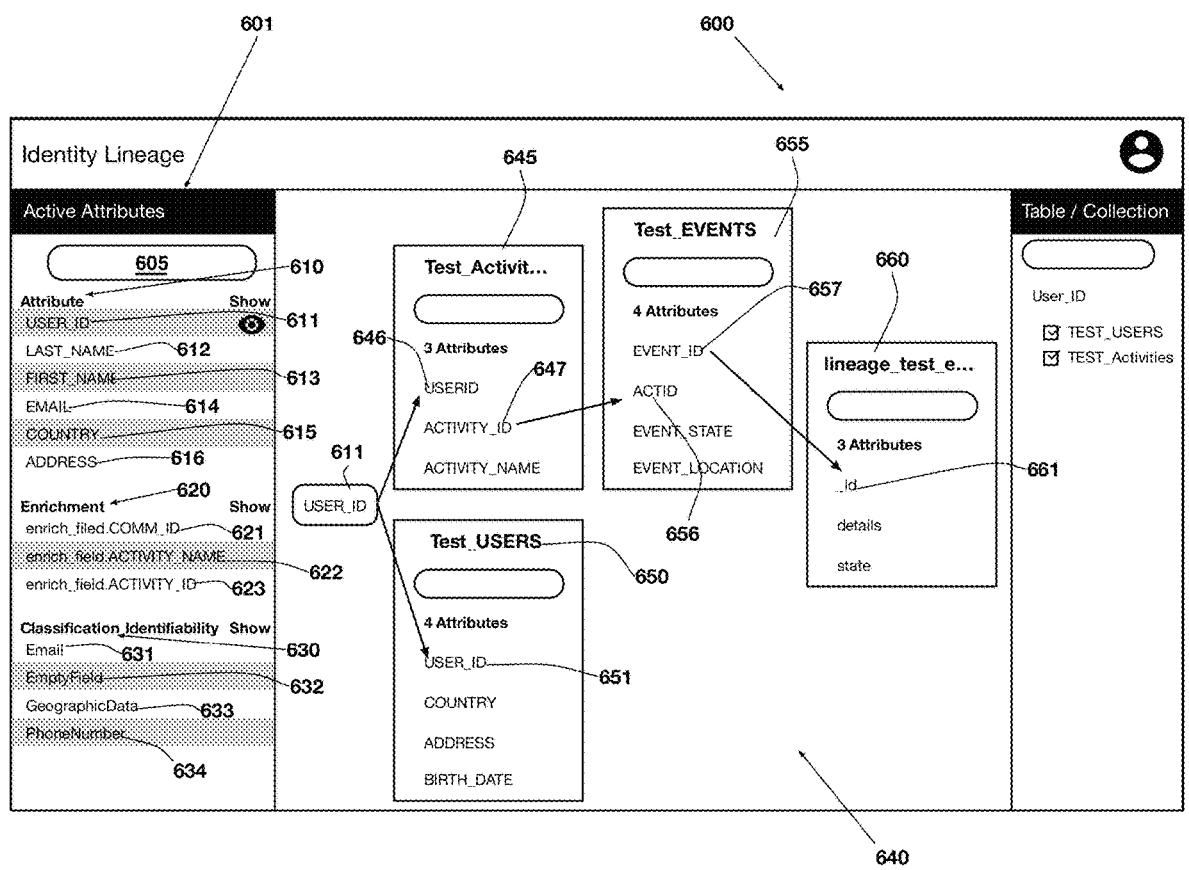
FIG. 6 shows an exemplary identity lineage screen.
Figure 7:
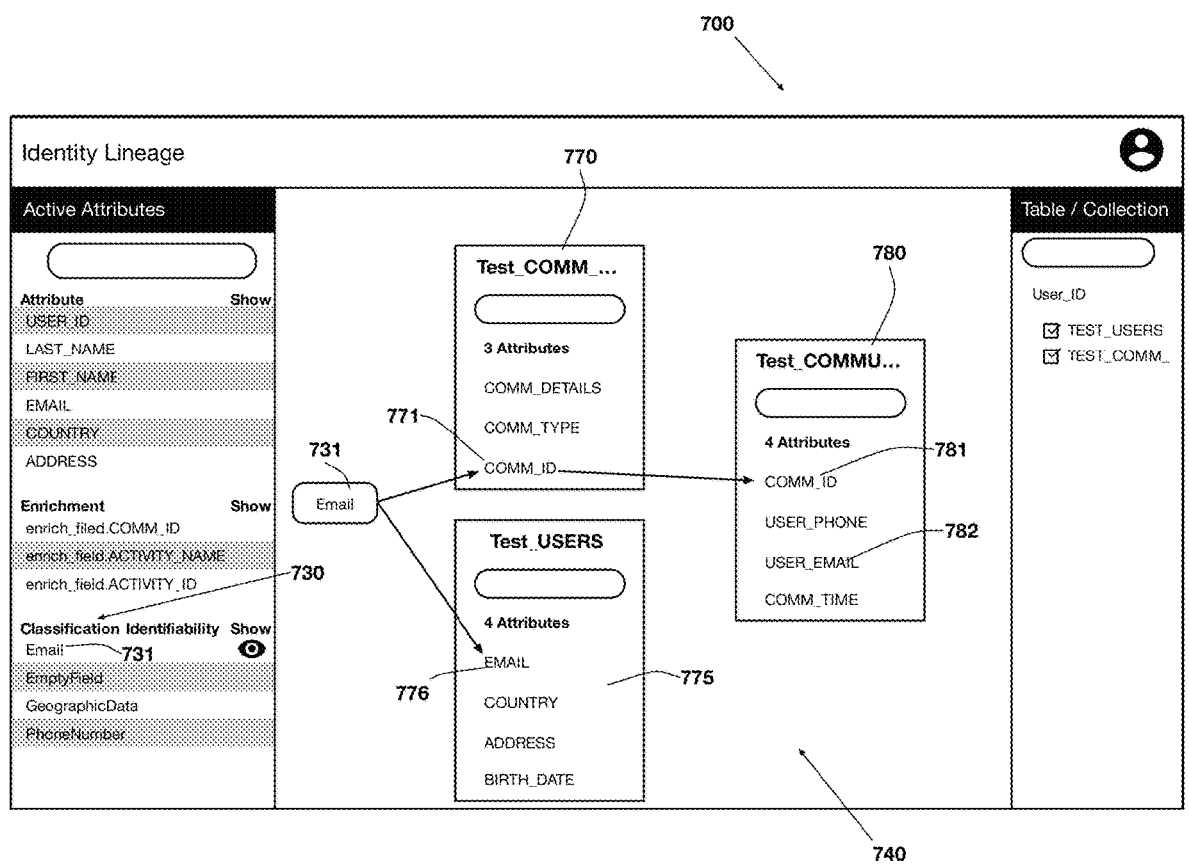
FIG. 7 shows another exemplary identity lineage screen.

Referring to FIGS. 6 and 7, in one embodiment, the system may provide an identity lineage dashboard (600, 700) to allow users to visualize data attributes that are associated with data subject profiles stored in the identity graph, data sources that contain such attributes, and connections between such attributes and/or data sources. Generally, the identity lineage dashboard may present lineage routes between structured objects (i.e., relational database tables, MongoDB collections, etc.), across any number of connected data sources.

In one embodiment, a list of root objects 601 may be displayed to a user for selection.

Additionally or alternatively, a user may search for available root objects via a search feature 605. The root objects may comprise IDSoR attributes 610 (e.g., USER_ID 611, EMAIL 612, LAST_NAME 613, FIRST_NAME 614, COUNTRY 615, ADDRESS 616, etc.); enriched attributes 620 (e.g., enrich_field.COMM_ID 621, enrich_field.ACTIVITY_NAME 622, enrich_field.ACTIVITY_ID 623, etc.); and/or classifications 630 found via a full scan (e.g., Email 631, EmptyField 632, GeographicData 633, PhoneNumber 634, etc.).

A user may select one of the root objects 601 to display a corresponding lineage route 640. As shown, the first level descendants of a root object (e.g., USER_ID 611) may comprise the object(s) (e.g., 645 and 650) in which the root object is found. The descendants in every other level (e.g., 655 and 660) may comprise objects that are connected to objects in the previous level by the same value global unique identifiers ("GUIDs").

In the embodiment illustrated in FIG. 6, the selected root object is an IDSoR attribute 610 (i.e., USER_ID 611). As shown, the system may retrieve and display all routes that descend from the USER_ID attribute 611. For example, attributes corresponding to the USER_ID 611 are shown to be contained within a TEST_ACTIVIT table 645 (USRID 646) and a TEST_USERS table 650 (USER_ID 651). The ACTIVITY_ID 647 attribute is located within the TEST_ACTIVIT table 645 and a corresponding attribute is located within a TEST_EVENTS 655 table (ACTID 656). The TEST_EVENTS table 655 includes an EVENT_ID attribute 657, which corresponds to the_id 661 attribute located in a lineage_test_e table 660. Accordingly, the system may display all events stored in the lineage_test_e table 660 for a given, unique USER_ID attribute 611.

Referring to FIG. 7, an identity lineage screen 700 is shown for the case where the root object is a classification attribute 730 (i.e., Email 731). As shown, the system may retrieve and display all routes 740 that end in user data (e.g., objects with IDSoR attributes). In the illustrated example, the Email 731 attribute corresponds to the EMAIL 776 attribute contained within TEST_USERS table 775. The Email attribute is not contained in the TEST_COMM 775 table; however, the COMM_ID attribute 771 in the TEST_COMM_table 775 is linked to the TEST_COMMU table 780 via the COMM_ID 781 attribute, and that table contains a USER EMAIL 782 corresponding to the Email 731 attribute.

Figure 8:
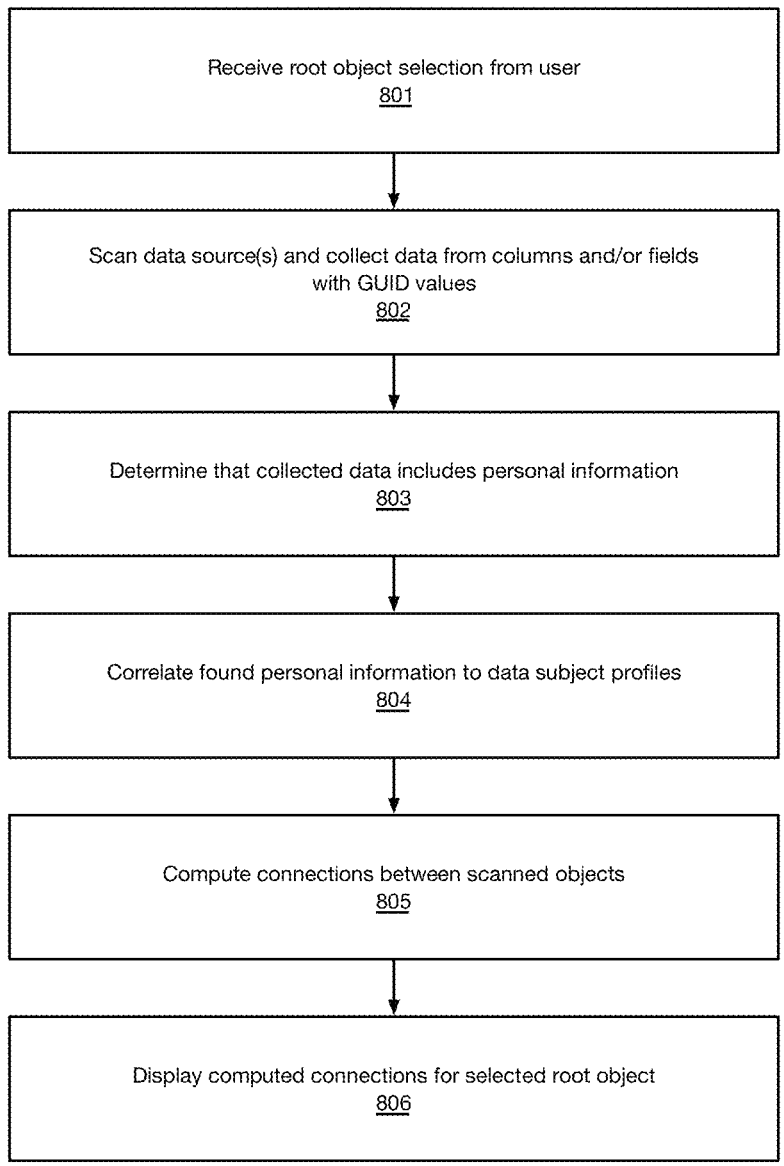
FIG. 8 shows an exemplary method of creating and displaying an identity lineage.

Referring to FIG. 8, an exemplary method of generating a lineage route for a given root object is illustrated. As shown, the process begins at step 801, where the system receives root object information from a user relating to a selected attribute. The system may then conduct a scan 802 (e.g., a sample scan) of one or more connected data sources to collect data from columns and/or fields with GUID values.

At step 803, the system may determine that the collected data comprises one or more personal information attributes (e.g., using regular expressions). The system may then correlate each of the personal information attributes to data subject profiles in the identity graph 804 and compute connections between scanned structured objects 805. Finally, the system may display computed connections for the selected root object in graphical format 806 (e.g., using Graph Search or other applications).

The system may store a great deal of information and insights collected from various analyzed data sources. In certain embodiments, this information may be made available to users (e.g., security and privacy analysts) via a client application, such that they may quickly and efficiently determine answers to questions relating to the privacy posture of the organization.

To that end, the system may provide a client application adapted to provide information to users via one or more screens comprising various user interface elements. Exemplary client applications may display information pertaining to privacy awareness and governance, compliance and/or risk. The application may allow non-technical users to extract privacy intelligence using simple menus and natural language search.

Figure 9:
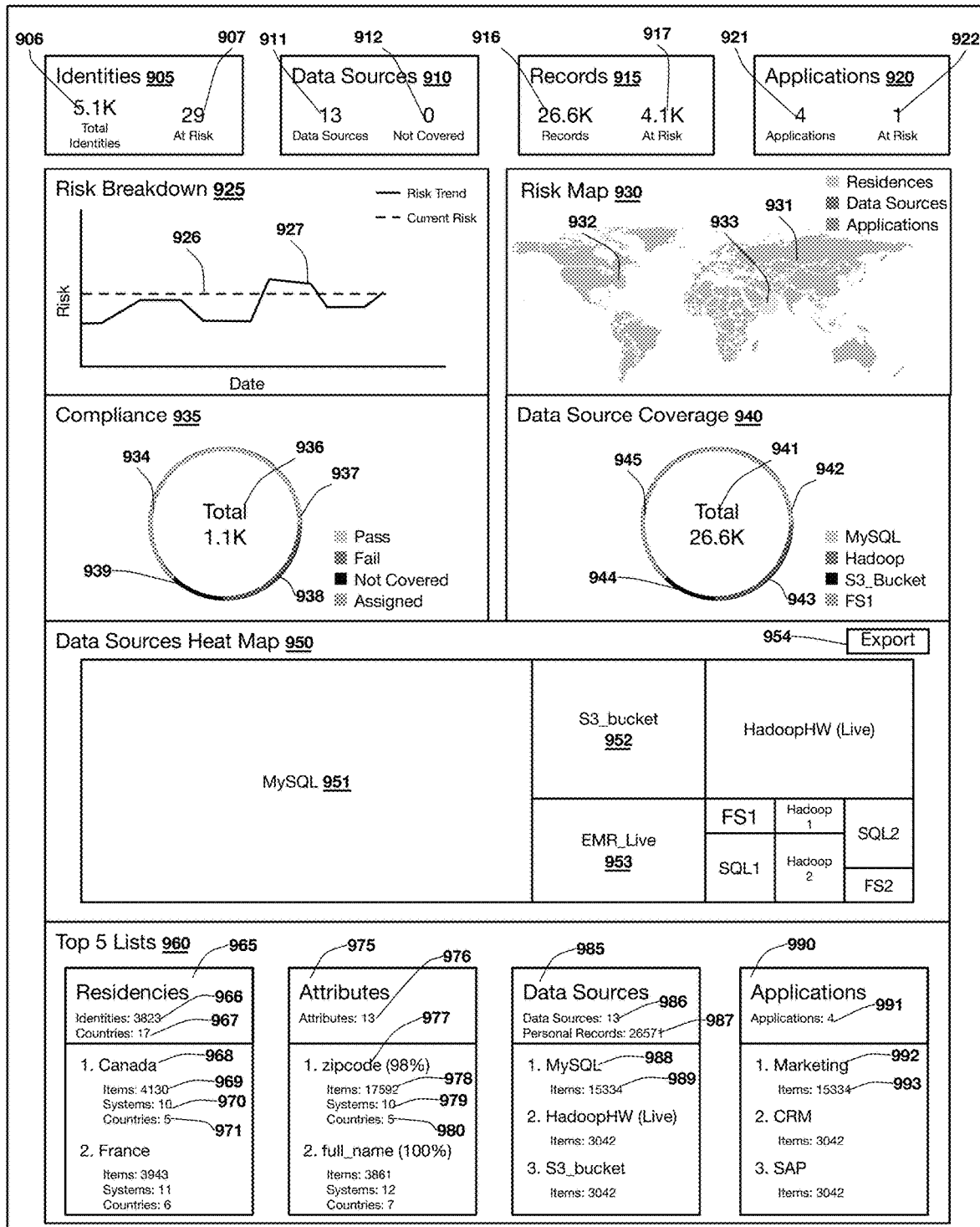
FIG. 9 shows an exemplary risk dashboard screen.

Referring to FIG. 9, an exemplary risk dashboard screen is illustrated. As shown, the risk dashboard provides an assessment of the risk of privacy exposure to one or more data subjects and/or an organization.

As discussed above, the system may search connected data sources in order to find stored personal information and to correlate such personal information to data subjects. As the system conducts personal information searches, the system may quantify the risk (i.e., by calculating a risk score) associated with one or more of the following: stored personal information attributes, personal information records associated with such attributes, data subjects to whom the records correspond, data sources where attributes are stored, geological locations where data sources are located, application(s) that access stored attributes, any number of activities relating to attributes performed by applications and/or users who perform such activities.

The system may comprise a risk engine that employs one or more risk models to calculate risk score calculations. The risk engine may be built on a modular infrastructure that allows users to select and/or define privacy risk rules included in the risk models. In one embodiment a preconfigured risk model comprising privacy risk rules may be stored in the system. For example, a default risk model may be provided comprising rules based on standards defined by industry analysts, the NIST and/or the EU.

In another embodiment, risk models may be customizable in order to allow organizations to add, delete and/or modify one or more privacy risk rules (e.g., one or more variable weights and/or thresholds) as desired or required to fit the organization's risk profile. For example, an organization may choose to assign a higher risk factor to data subjects residing in the EU than to data subjects residing in the US. As another example, an organization may assign added risk to data sources located outside the US.

Exemplary privacy risk rules may be based on any number of variables, such as but not limited to: data sensitivity (e.g., personal information attribute type); data residency (e.g., a location where data is stored, an encryption status of the data, etc.); application profile (e.g., the type of application(s) accessing an attribute, such as internal, external, mobile, etc.); user access profile (e.g., the number of users who access an attribute); access location information (e.g., the specific location(s) and/or number of different locations from which attributes are accessed); and/or data subject information (e.g., residency, customer value and/or rank of a data subject associated with an attribute). It will be appreciated that such variables may be static (e.g., user residency, data residency) or may be dynamic (e.g., application information, location information). It will be further appreciate that each of the above variables may be manually entered into the system, received from a connected data source and/or may be automatically determined by the system.

As a specific example, the system may track personal information access of various applications and/or how such information is used in order to calculate a risk score for each stored attribute (and/or combination of attributes). The attribute risk score may be calculated based on one or more of the following factors: the number of times the attribute is accessed, the applications access the attribute, the last time the attribute was accessed, the rate of attribute access, and/or the velocity of the access.

As another specific example, a risk score may be determined for each data subject, based on one or more of: the data subject's authentication, authorization, roles and/or privileges within or across data sources and/or applications. Such information may be manually input by a user, automatically determined by the system, and/or received from one or more connected data sources (e.g., an identity management system and/or CRM system).

In certain embodiments, the system may calculate an aggregate risk score for a given entity according to the following equation:

$$R(e^i) = f(R^{static}_t e^i, R^{dynamic}_t e^i, R^{velocity}_t e^i, R^{rate}_t e^i)$$

The system may additionally or alternatively calculate a population risk according to the following equation:

$$R^{pop}(e^i) = f(R^{pop\text{-}static}_t e^i, R^{pop\text{-}dynamic}_t e^i, R^{pop\text{-}vel}_t e^i, R^{pop\text{-}rate}_t e^i)$$

In one embodiment, the calculated risk may be correlated to a monetary risk to the organization. For example, a value may be associated with each data subject customer, based on a lifetime value of the customer or other factors.

Generally, each calculated risk score may be employed to characterize, tag or otherwise classify information stored in the system. For example, the system may tag a stored object as "at risk" if the object's risk score is above a predetermined threshold. As another example, objects may be tagged with one or more colors based on a calculated risk score, and such objects may be displayed throughout the system in the relevant color.

As shown in FIG. 9, the risk dashboard may display an identities widget 905 to provide risk information about the data subjects having personal information stored in one or more of the scanned data sources. This widget may display the total number of data subjects 906 across all data sources and/or the number of data subjects that have been tagged as "at risk" 907.

The risk dashboard may display a number of widgets to provide detailed risk information about an organization's various data sources. The dashboard may comprise a data sources overview widget 910 that displays the total number of connected data sources 911 and/or the number of such data sources that have not been searched 912 by the system.

The risk dashboard may further comprise a data sources details widget 940 to provide information about the personal information stored in connected data sources. As shown, the widget may display a graph showing the total number of personal information records across all data sources 941 and a breakdown of the number of such records associated with each of the data sources (e.g., MySQL 942, Hadoop 943, S3_Bucket 944, and FS1 945).

The risk dashboard may further comprise a data sources heat map widget 950. As shown, the heat map may display data sources that have been scanned by the system and determined to store personal information (e.g., MySQL 951, S3 bucket 952, EMR_Live 953, etc.). The size of each data source representation in the heat map may be based on the amount of personal information stored in the respective data source or on a risk score calculated for each data source. The data sources heat map may provide an option to export the data 954, for example to a CSV file.

In certain embodiments, the dashboard may comprise a personal information records widget 915 to display information about the total number of personal information records 916 associated with attributes found throughout the various data sources and/or the number of such personal information records that have been tagged as "at risk" 917.

The risk dashboard may include an applications widget 920 to provide information about the applications that access personal information. As shown, the applications widget may display the total number of such applications 921 and/or the number of applications that have been tagged as "at risk" 922.

In one embodiment, the risk dashboard may include a risk breakdown widget 925. As shown, this widget may display a graph showing an aggregate view of an organization's risk score over time. The widget may display the organization's current risk score 926, as well as any number of historical risk scores 927. In one embodiment, this widget may provide a link to an activities widget (see FIG. 10 at 1040) that allows filtering based on risk variables, such as data subject, location, application, etc.

The risk dashboard may further display a risk map widget 930 adapted to provide information relating to the location of various data sources 932, residencies 931 and/or applications 933 that have been determined to be "at risk." As shown, such information may be overlaid on a map to allow a user to easily determine the location of such at-risk information.

The risk dashboard may further comprise one or more widgets showing top risk indicators 960. As shown, such widgets may include a risky residencies widget 965, a risky attributes widget 975, a risky data sources widget 985 and/or a risky applications widget 995.

The risky residencies widget 965 may display a number of data subject residencies 968 with the highest aggregate risk scores (i.e., the riskiest residencies). For each displayed residency location 968, the widget may provide the number of personal information records associated with data subjects who reside in the location 969, the number of data sources 970 that contain personal information associated with data subjects who reside in the location and/or the number of countries 971 in which such data systems are located. This widget may also display the total number of data subjects 966 that reside in the displayed residency locations and/or the total number of countries 967 in which data sources containing personal information associated with such data subjects are located.

The risky attributes widget 975 may display a number of personal information attributes 977 with the highest aggregate risk scores (i.e., the riskiest attributes). For each displayed attribute 977, the widget may provide the number of personal information records associated with the given attribute 978, the number of data sources 979 that store the given attribute and/or the number of countries 980 in which such data systems are located. This widget may also display the total number of attributes 976 stored across the organization's various data sources.

The risky data sources widget 985 may display a number of data sources 988 with the highest aggregate risk scores (i.e., the riskiest data sources). For each displayed data source 988, the widget may provide the number of personal information records associated with personal information stored in the data source 989. This widget may also display the total number of data sources 986 across the organization and/or the total number of personal information records 987 created from scans of the data sources.

Finally, the risky applications widget 990 may display a number of applications 992 with the highest aggregate risk scores (i.e., the riskiest applications). For each displayed application 992, the widget may provide the number of personal information attributes 993 accessible by a given application. This widget may also display the total number of applications 991 across the organization that access personal information.

In certain embodiments, the dashboard may comprise a privacy compliance widget 935 adapted to provide information relating to an organization's compliance with stored compliance rules and regulations (discussed in detail below with reference to FIG. 12). As shown, this widget may display the total number of connected data sources 936, the number of such data sources that pass all compliance rules 937, the number of such data sources that have failed one or more of the compliance rules 938, the number of such data sources that are not covered by any compliance rules 939 and/or the number of such data sources that have been assigned to other users 934 for further investigation and/or correction of any compliance violations.

Figure 10:
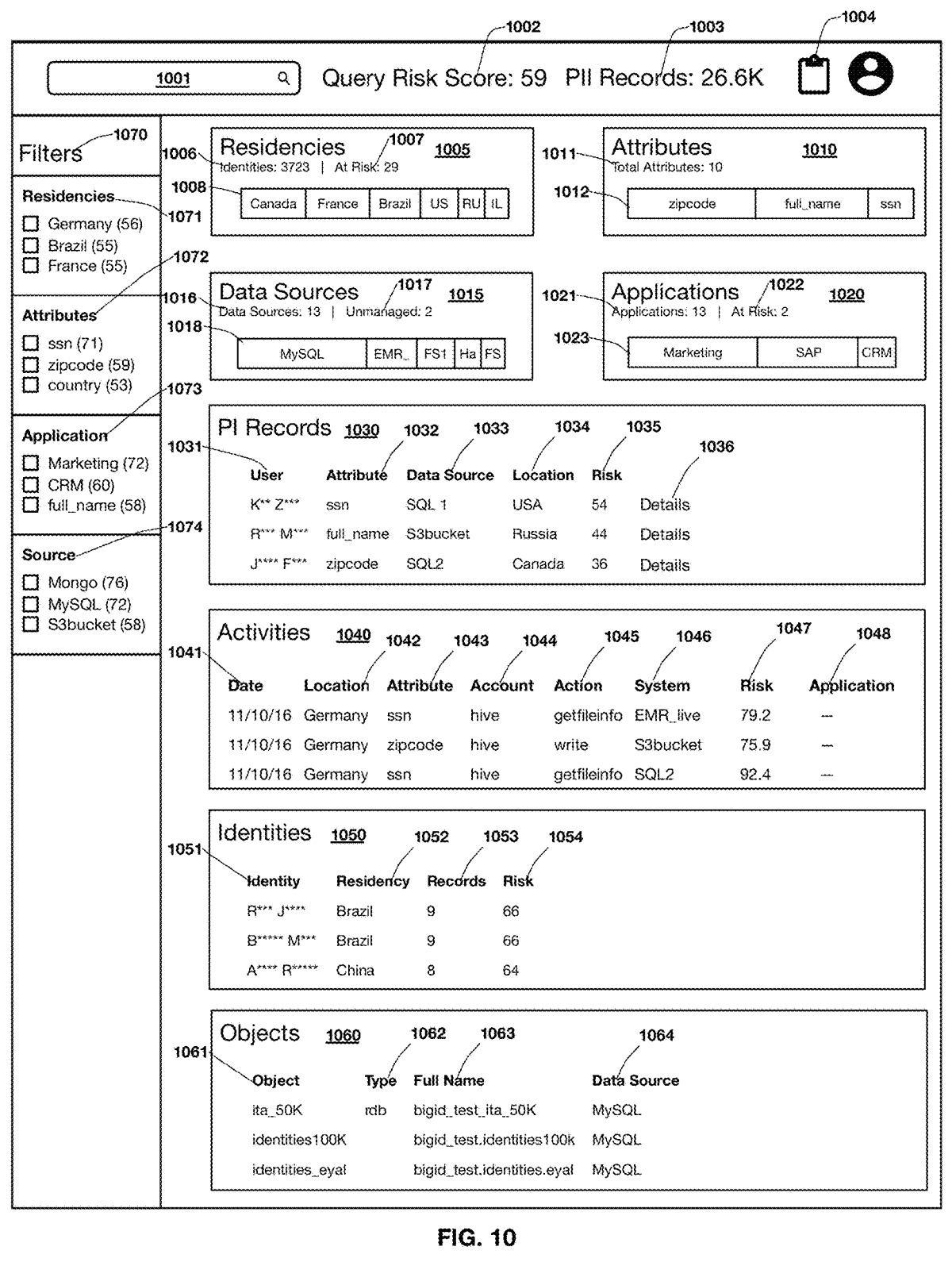

Referring to FIG. 10, an exemplary exploration screen is illustrated. As shown, the exploration screen may provide a number of interface elements, such as widgets and/or reports, to display privacy information to users.

In one embodiment, the exploration screen may comprise a data subject residencies details widget 1005 to provide detailed information about the geographic locations where data subjects reside. This widget may display the total number of data subjects 1006 having personal information stored in one or more connected data sources and/or the number of such data subjects that have been tagged as "at risk" 1007. The data subject residency widget may further display each of the locations 1008 (e.g., countries) in which data subjects. The size of a given location representation in the widget may be based on the number of data subjects who reside at the location and/or may be based on an aggregate risk score associated with the location.

The exploration screen may display an attributes details widget 1010 to provide detailed information about the personal information attributes that are stored across an organization's data sources. As shown, the widget may display the total number of attributes 1011 stored across all connected data sources. The attributes details widget may further display a list comprising each of the stored attributes 1012. In one embodiment, the size of a given attribute representation in the widget may be based on the number of times the attribute appears throughout the connected data sources. In other embodiments, the size may be based on an aggregate risk score associated with the attribute.

In one embodiment, the exploration screen may comprise a data sources details widget 1015 to provide detailed information about the connected data sources. As shown, the widget may display the total number of connected data sources 1016 and/or the number of such data sources that are not managed by the system 1017. The data sources details widget may further display a list comprising each of the connected data sources 1018. In one embodiment, the size of a given data source representation in the widget may be based on the amount of personal information stored in the data source. In other embodiments, the size may be based on an aggregate risk score associated with the data source.

The exploration screen may comprise an applications details widget 1020 to provide detailed information about the applications that access personal information stored in the connected data sources. As shown, the widget may display the total number of applications that have access to personal information 1021 and/or the number of such applications that have been tagged as "at risk" 1022. The applications details widget may further display a list comprising each connected application 1023. In one embodiment, the size of a given application representation in the widget may be based on the amount of personal information that the application may access. In other embodiments, the size may be based on an aggregate risk score associated with the application.

In one embodiment, the exploration screen may comprise a personal information records list 1030. As shown, the list 1030 may include each of the personal information records stored in the system and any information associated therewith. For example, one or more of the following may be displayed for each record: a personal information attribute 1032 associated with the record, a data subject 1031 with whom the attribute is associated, the data source 1033 where such attribute is stored, a geographic location 1034 of the data source and/or a risk score 1035 associated with the personal information record. In certain embodiments, a link 1036 to each of the listed personal information records may be provided.

The exploration screen may further comprise an activities list 1040 comprising each detected interaction with personal information stored in one or more data sources and any information associated therewith. As shown, the activities list 1040 may display one or more of the following for each detected activity: a date and/or time 1041 when the activity occurred, the attribute 1043 that was accessed, the data source where the attribute is stored 1046, a location 1042 where the data source is located, the account 1044 that performed the activity, the type of activity 1045 performed (e.g., read, write, etc.), a risk score 1047 associated with the activity and/or an application 1048 responsible for the activity.

In certain embodiments, the exploration screen may display a data subjects details list 1050 comprising information associated with each of the data subjects stored in the identity graph. As shown, the data subjects details list 1050 may display one or more of the following for each data subject: a name 1051 of the data subject, a residency 1052 of the data subject, the number of stored personal information records 1053 associated with the data subject and/or a risk score 1054 associated with the data subject.

Additionally or alternatively, the exploration screen may display an objects details list 1060 comprising information relating to one or more objects that have been scanned by the system (e.g., database tables, database collections and/or files). As shown, the objects details list 1060 may display one or more of the following for each scanned object: an object display name 1061, an object type 1062, a full name of the object 1063 and/or a data source 1064 associated with the object.

As shown, the exploration screen may display a number of user-selectable filters 1070. Such filters may allow a user to limit the data displayed in one or more of the above widgets and lists. For example, a user may select one of the displayed filters to limit the displayed information to a relevant residency 1071, attribute 1072, application 1073 and/or data source 1073.

Similarly, the exploration screen may comprise search functionality 1001, such as a natural language query interface. In response to receiving search parameters from a user, the system may automatically apply one or more filters to the information displayed via the various widgets and lists of the exploration screen. This allows users receive answers to questions in a simple, non-technical fashion.

As a specific example, a user may conduct a search by typing or speaking the following phrase: "show me personal information of German residents found outside Germany." In response, the system may limit information displayed in each of the various lists and widgets to information matching the query (i.e., where data subject residency is equal to Germany and data source location is not equal to Germany). Accordingly, any residencies, attributes, data sources, applications, personal information records, data subjects and objects that do not match the search parameters will not be shown in the respective interface elements.

In response to receiving search parameters (e.g., via the search box 1001), the system may display the total number of personal information records 1003 that match the search. Additionally or alternatively, the system may display a risk score 1002, based on the results of the search. Such risk score may comprise an aggregate risk score across all residencies, attributes, data sources, applications, personal information records, activities, and/or data subjects that match the search criteria. It will be appreciated that, if no search parameters have been received, the query risk score may be equal to the organization's current aggregate risk score across all objects.

Although not shown, the system may provide risk mitigation recommendations, optionally ordered by impact on the total risk. For example, the system may identify personal information that is not associated with any data subjects or that is not used, so such data can be purged.

Figure 11:
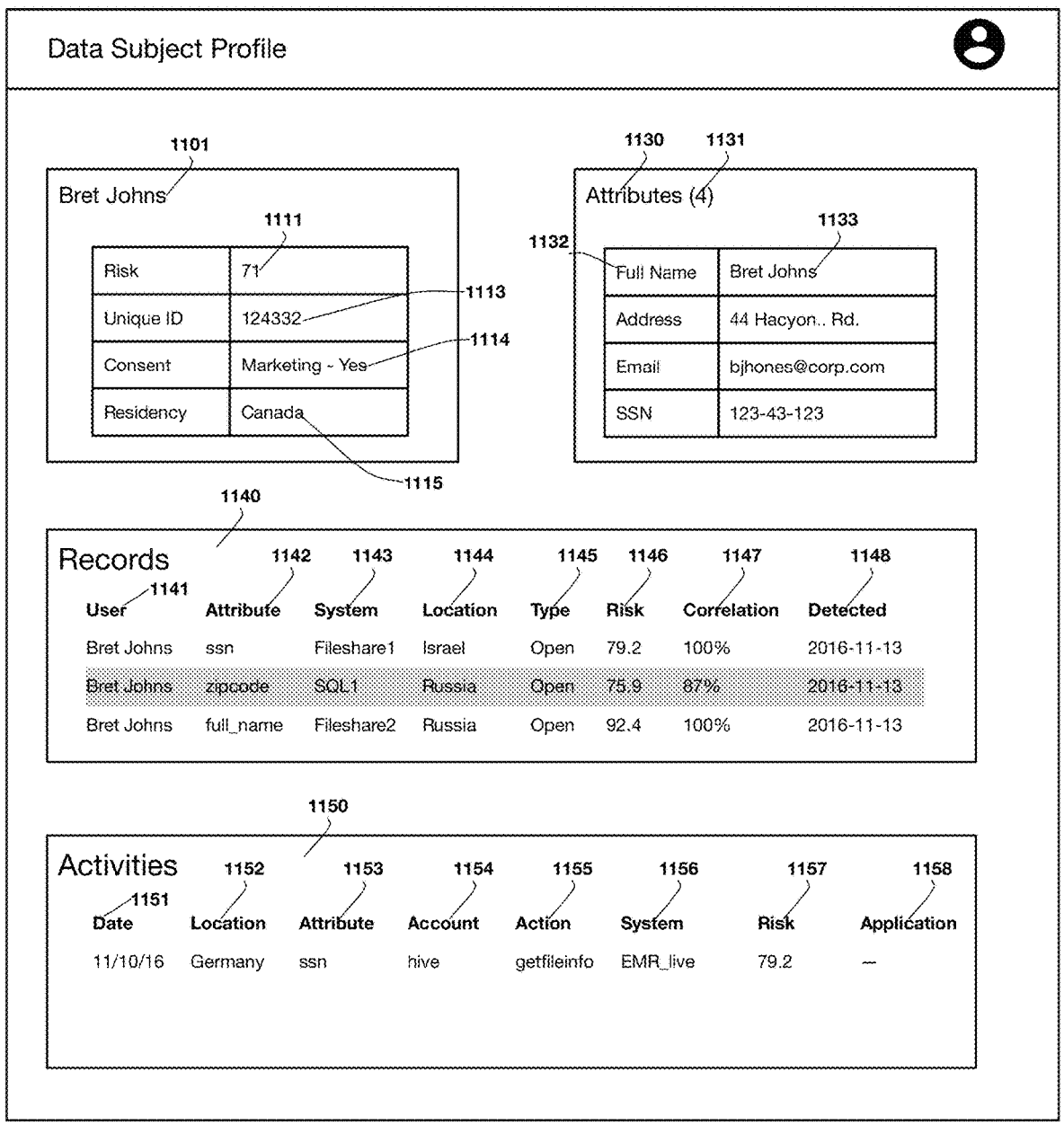
FIG. 11 shows an exemplary data subject profile screen.

Referring to FIG. 11, an exemplary data subject profile screen is illustrated. As discussed above, the system may maintain a data subject profile for each data subject having associated personal information stored in one or more data sources of an organization. Generally, the data subject profile may provide an single location to allow a user to search and review information associated with a specific data subject.

As shown, the data subject profile screen may display data subject identification information associated with a given data subject, such as but not limited to, the data subject's name 1101 and unique ID 1114. In one embodiment, the profile screen may display additional information associated with the data subject, such as a data subject risk score 1111, residency information 1115 and/or any received consent information 1114 associated with the data subject.

The profile screen may display an attributes summary list 1130 comprising information about each of the data subject's personal information attributes that are stored in one or more data sources. For each attribute in the list, the system may display the attribute name 1132 and, if allowed, a value of the attribute 1133. The attributes summary 1130 may also display the total number of unique attributes 1131 associated with the data profile.

In one embodiment, the profile screen may comprise a personal information records list 1140 to display each of the created personal information records that are associated with the data subject. As shown, the list may display one or more of the following for each personal information record: a personal information attribute 1142 associated with the record, a data subject 1141 associated with the attribute, a data source 1143 where the attribute was found, a geographical location 1144 of the data source, one or more tags associated with the record 1145, a risk score 1146 associated with the record, an identification score 1147 associated with the record/attribute (i.e., an indication of how certain the system is that the record should be associated with the data subject) and/or a date 1148 when the attribute was found. If desired or required, such information may also be made available via an API for application integration.

Additionally or alternatively, the profile screen may comprise an activities list 1150 to display information relating to each detected interaction with the data subject's personal information stored in one or more data sources. As shown, the activities list 1150 may display one or more of the following for each detected activity: a date and/or time 1151 when the activity occurred, the attribute 1153 that was accessed, the data source 1156 where the attribute is stored, a location 1152 (e.g., a country) where the data source is located, the account 1154 that performed the activity, the type of activity 1155 performed (e.g., read, write, etc.), a risk score 1157 associated with the activity and/or an application 1158 responsible for the activity. In one embodiment, any activity that violates user consent may be highlighted. Similarly, any activity having a risk score above a predetermined threshold and/or otherwise tagged as "at risk" may be highlighted.

Figure 12:
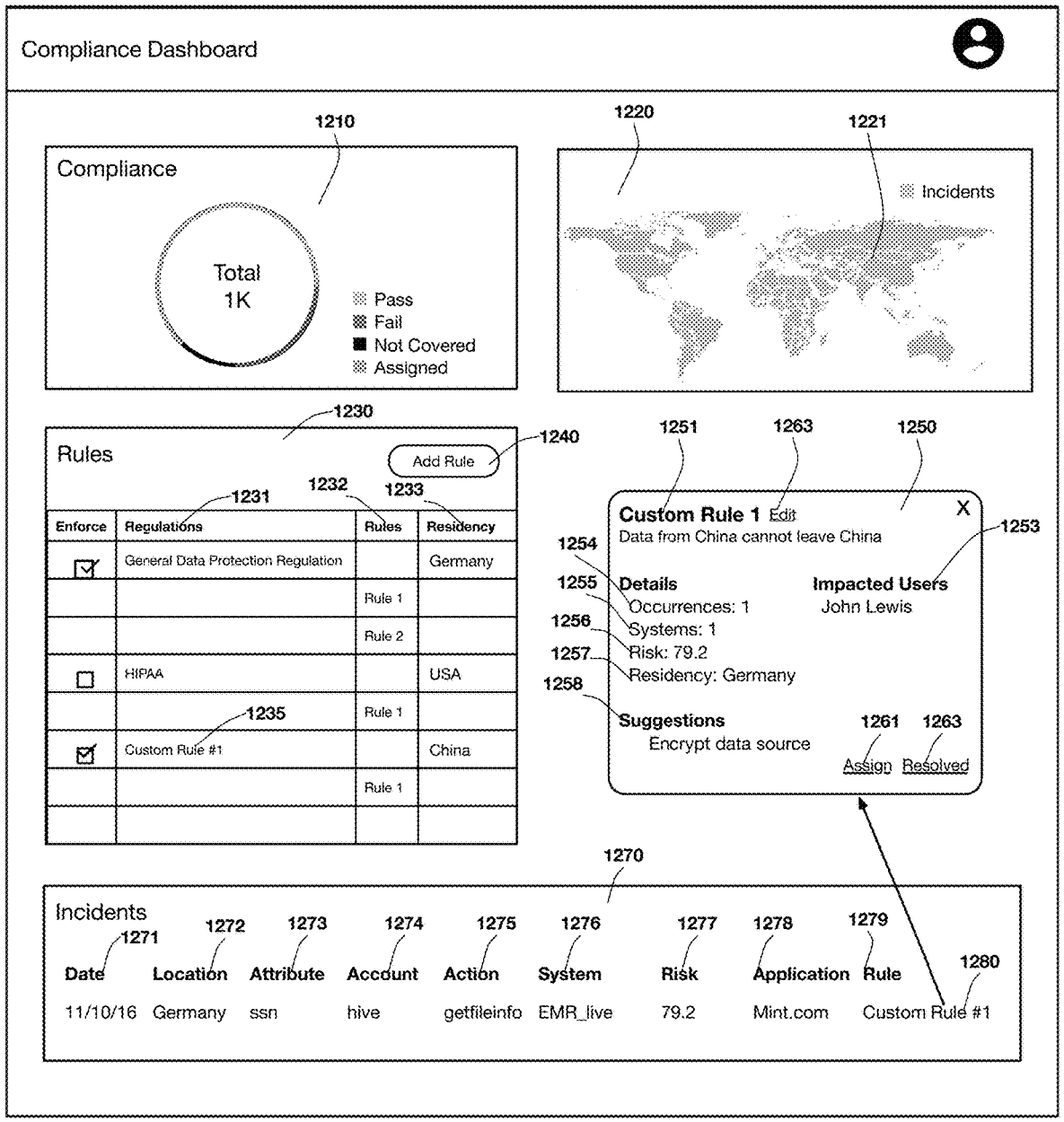
FIG. 12 shows an exemplary compliance dashboard screen.

Referring to FIG. 12 an exemplary compliance dashboard screen is illustrated. As shown, the compliance dashboard may display a number of widgets and other UI elements to allow users to view and/or manage compliance information, such as compliance regulations and rules, and compliance violations. Generally, the system may provide data usage and privacy compliance functionality to: (1) allow an organization to select, create and/or modify compliance rules, (2) determine residency information and/or activity information relating to stored personal information attributes and/or data subjects, (3) monitor such information to determine, based on the compliance rules, when compliance violations occur, (4) provide information about such compliance violations, and/or (5) allow users to resolve compliance violations.

As shown, the compliance dashboard may comprise a compliance rules management interface 1230. This interface may comprise a list of the compliance regulations 1231 stored in the system and specific compliance rules 1232 associated with each of the regulations.

In one embodiment, the system may be pre-populated with a number of compliance regulations 1231 that may be employed to determine whether an organization is appropriately storing, accessing and/or protecting personal information for any number of data subjects. As shown, the compliance regulations 1231 may include a number of compliance rules 1232 that may be selected by a user.

Additionally or alternatively, the compliance rules management interface 1230 may comprise an option 1240 to allow a user to create custom compliance regulations and/or rules. Selecting this option may allow the user to import an ad hoc query as a compliance rule and, optionally, assign the same to a regulation. Once a custom compliance rule 1235 is created, it may be continuously monitored by the system such that violations of the rule may be reported. Accordingly, the system allows for administrators to define rules that govern the use of personal information and may further allow such users to test these rules against the actual use of data as discovered by the system.

Generally, each of the compliance regulations and rules may be based on one or more variables, such as but not limited to: an attribute type, a location where the attribute is stored, consent of a data subject associated with the attribute, data subject residency, user access privileges, application type, application location, application privileges, activity type and/or activity patterns.

As an example, one or more of the regulations 1231 and/or rules 1232 may be associated with residency information 1233 when the rule/regulation applies only to personal information that is stored in a specific location and/or that is associated with a data subject who resides in a specific location (e.g., US, State level, EU, Japan, etc.). In other words, a compliance regulation (and all associated rules) will not be employed to determine compliance for a given personal information attribute that is stored in a location that differs from a specified data or data subject residency 1233.

As another example, rules/regulations may relate to the type of application accessing personal information. Accordingly, a first rule may allow personal information to be consumed by applications tagged as "external processing" but not by applications tagged as "marketing." Another rule may allow zip code information to be used by applications tagged as "accounting," but not by application tagged as "sales."

As yet another example, the compliance regulations/rules may relate to duplicate data and/or data that has not been accessed within a specified period of time. Such compliance rules may allow an organization to adopt a data minimization strategy by deleting or reducing inessential duplicate or unused data.

In certain embodiments, the regulations and/or rules may be associated with one or more actions for the system to take in the event that a given rule is violated. Exemplary actions may include creating an incident report in one or more formats, deleting or moving data, and/or sending a notification to one or more specified users (e.g., an administrator and/or an end user).

Once compliance regulations/rules are entered, the system may monitor connected data sources to determine whether any compliance violations occur. And, in the event of a compliance violation, the system may automatically trigger any action associated with the violated compliance regulation/rule.

As shown in FIG. 12, one or more compliance incident reports may be created when compliance violations are detected by the system and such reports may be presented via a compliance incidents interface 1270 for quick reference. The incidents interface 1270 may display one or more of the following for each incident report: a date of the incident 1271, a location of the violating application or data source 1272, the personal information attribute 1273 associated with the incident, an account 1274 associated with the incident, a data source 1276 in which the attribute is stored, a risk score 1277 associated with the incident, an application 1278 associated with the incident, an action or activity 1275 taken by the application with respect to the attribute and/or the compliance regulation/rule 1279 that was violated. In one embodiment, a user may select one of the displayed incident reports (e.g., incident report 1280) to view a compliance incident report details interface modal or screen 1250.

The compliance incident report details interface 1250 may display information about a violated compliance regulation/rule, such as: the name of the regulation/rule that was violated 1251 and/or a description 1252 thereof. This interface may also provide detailed information about the compliance violation, such as the number of times the violation occurred 1254, the total number of affected data sources 1255, an aggregate risk score associated with the violation 1256, any associated residency information 1257, each of the impacted data subjects 1253 and/or a number of suggested mitigating activities 1258 that may be taken to correct the violation. As shown, the compliance incident report details interface 1250 may allow a user to edit the violated compliance regulation/rule, for example by selecting an edit option 1263.

Although not shown, the regulations 1231 and/or rules 1232 displayed in the compliance incident report details interface 1250 may include a link to a privacy policy from which the regulation/rule originates. Accordingly, when an auditor reviews the incident report, she can view the rule, the original legal definition presented to the user, a confirmation that the user accepted the policy and/or other details of the compliance violation.

In certain embodiments, the system may provide compliance incident management functionality to allow users to create and manage tasks associated with compliance violations. As shown, the system may allow for a compliance-violation-related task to be created and assigned to, for example, an owner of an application that caused the incident (e.g., via the "assign" link 1261).

Upon being assigned a task, an email or other notification may be sent to a user. The user may then access the incident management facility via one or more of the dashboards (see FIG. 10 at 1004) in order to view the task. Once the user has resolved the compliance violation, they may update the status of the incident to "resolved" by selecting a link 1262. Such action may cause a notification to be sent to one or more users who are associated with the incident such that they may be alerted that the incident has been fixed.

In an alternative embodiment, selection of the "assign" link 1261 may cause a service desk ticket to be created and assigned to a user to manage the compliance-violation-related issue via an integrated third-party service desk provider such as Zendesk or Service Now.

As shown, the compliance dashboard may further comprise a compliance widget 1210 adapted to provide information relating to an organization's compliance with stored compliance rules and regulations. This widget is substantially similar to the compliance widget 935 discussed above with respect to FIG. 9.

The dashboard may additionally or alternatively display a compliance incidents map widget 1220 adapted to provide information relating to the locations of various compliance violations or incidents 1221 (e.g., the locations where personal information associated with such incidents is stored). As shown, each detected compliance incident 1221 may be displayed on a map interface to allow a user to easily determine the location of such incidents.

Data Mapping Screen

Figure 13:
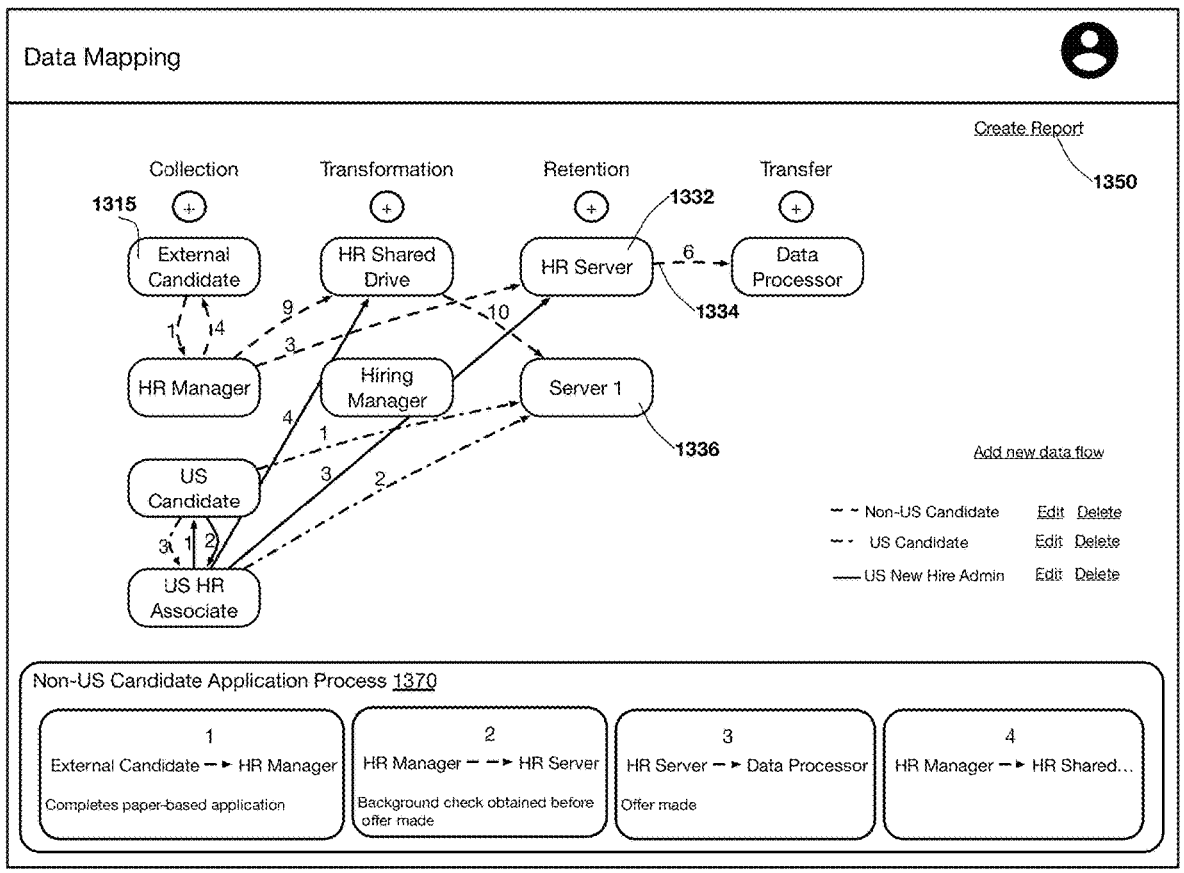
FIG. 13 shows an exemplary data mapping screen.

Referring to FIG. 13, an exemplary data mapping screen is illustrated. In certain embodiments, the system may collect log information from connected primary and secondary data sources and/or log management solutions in order to create and/or update data usage models. The system may collect activity information from the logs in order to analyze and build a data map describing how personal information is accessed, the applications that consume such data, where these applications reside in an organization's systems, and/or data access patterns. This data may be used to map the applications to the data and personal information and overlay the legal and business processes that are needed in order to analyze how personal information is processed and generate data flow diagrams required for regulatory purposes. Accordingly, the activities collected from the different data sources allow a user to build data flow diagrams that illustrate how personal data is processed from collection to retirement.

As shown, the data mapping screen may provide functionality to allow for manual or automatic modeling of objects such as actors 1315, data sources 1331 and/or applications 1332 in order describe one or more data flows 1334 among such systems for a business process 1370. For example, the system may receive and/or determine one or more of the following properties for each modeled actor: a display name, a description, contact information, an access level, a residency, and/or one or more personal information attributes used by the actor to complete the data flow. As another example, the system may receive and/or determine one or more of the following properties for each modeled system and application: a name, network information, an application/system type, owner information, an access level, residency information, a classifier and/or one or more personal information attributes stored or used to complete the data flow.

In one embodiment, the system allows data maps to be dynamically connected to the data source(s) they are intended to emulate, ensuring dynamic updating and an ability to leverage the data map as an actual data analysis tool. Moreover, any changes that are detected (e.g., additional applications that come online that are accessing personal data and/or abnormal access of existing applications or actors) can be automatically flagged based on one or more compliance regulations and rules, such that alerts may be sent to stakeholders (e.g., via push or pull notifications, email, or on a dashboard).

Accordingly, the system may maintain a complete audit of all access to personal information for future audit and compliance reporting purposes. Such information may be displayed to a user via the data mapping screen and/or may be exported as a report (e.g., via the "Create Report" link 1350).

Data Breach Investigation & Response

Figure 14:
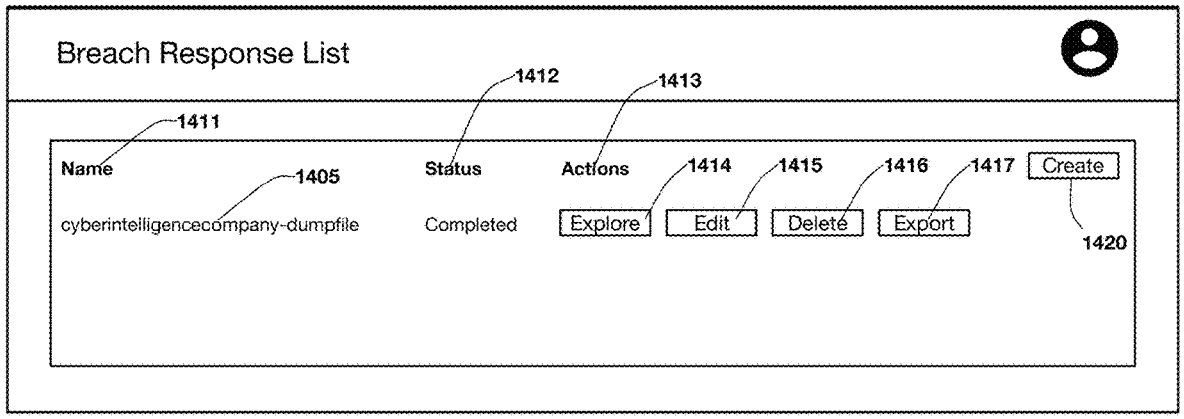
FIG. 14 shows an exemplary data breach response list screen.
Figure 15:
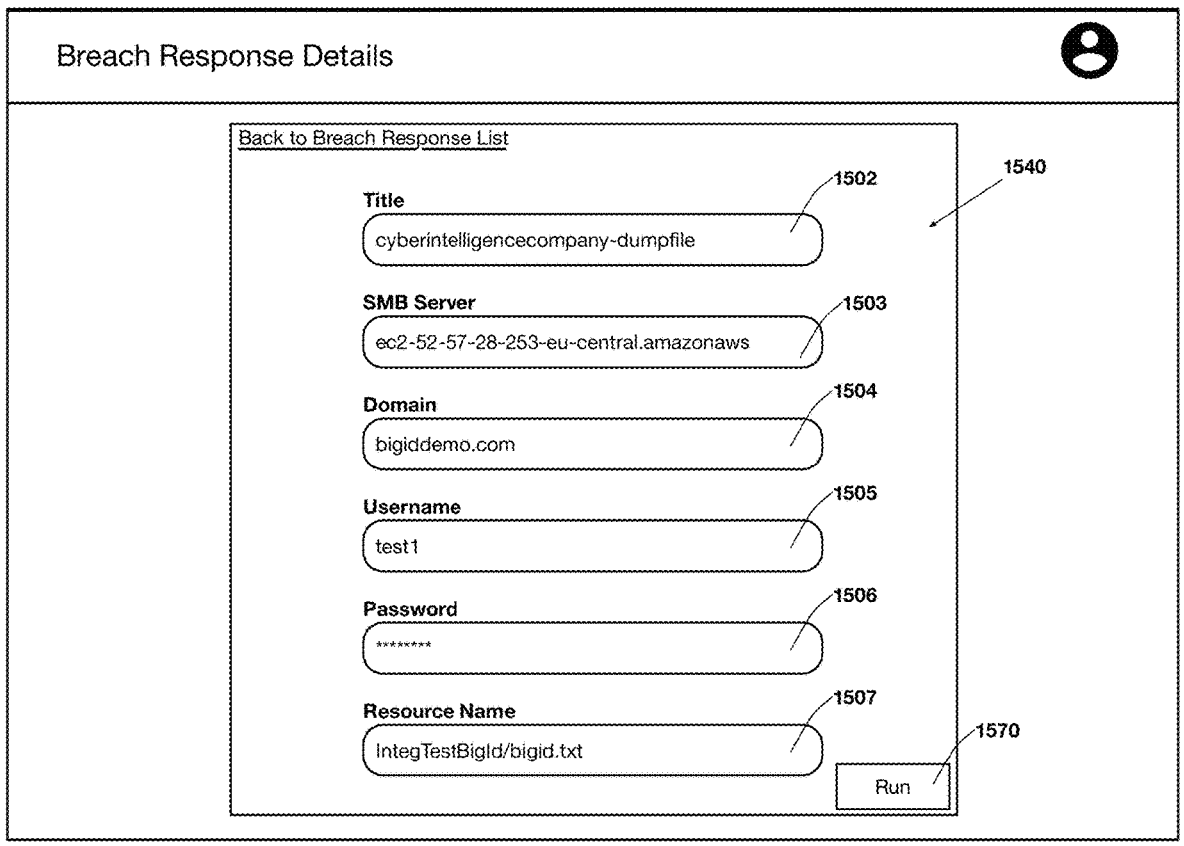
FIG. 15 shows an exemplary data breach response details screen.
Figure 16:
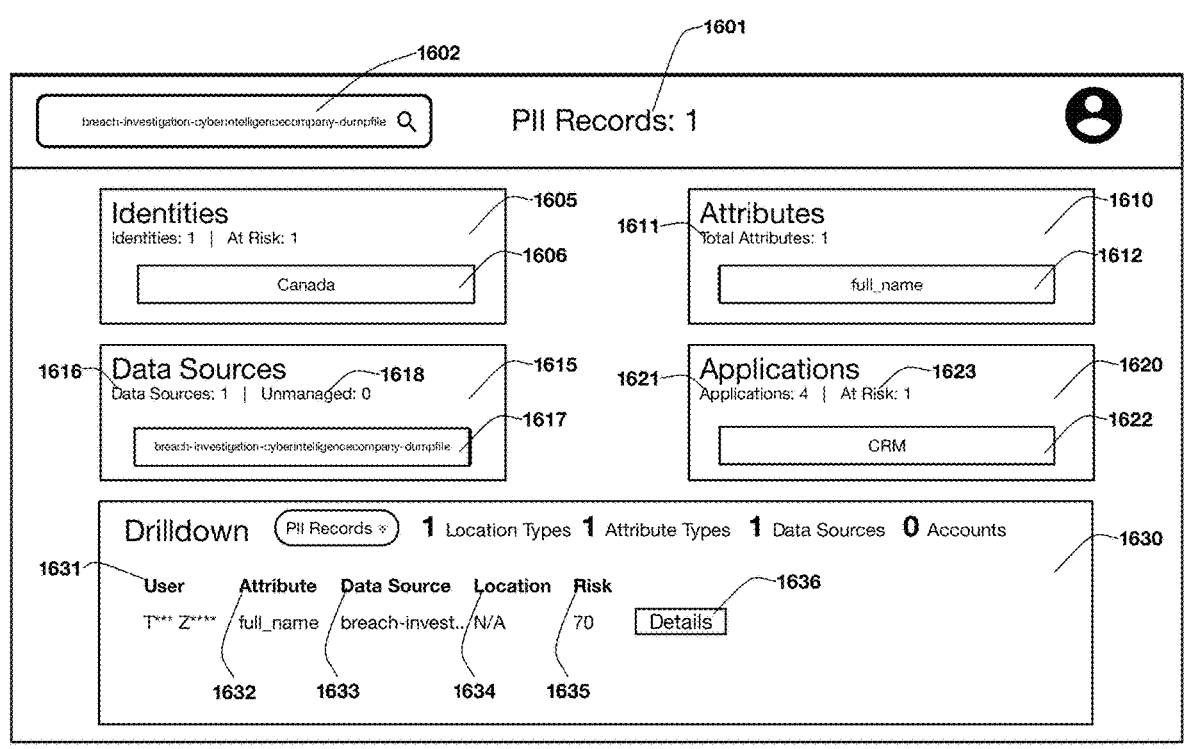
FIG. 16 shows an exemplary data breach response exploration screen.

Referring to FIGS. 14-16, exemplary data breach investigation and response screens are illustrated. As shown, the system may allow an organization to determine data subjects and/or data sources impacted in the event of a data breach.

Generally, a data breach is a security incident in which sensitive, protected or confidential data (e.g., personal information) is copied, transmitted, viewed, stolen and/or used by an individual unauthorized to do so. Data breaches may include theft or loss of digital media upon which such information is stored unencrypted (e.g., computer tapes, hard drives, or laptop computers) and/or the posting of such information on the Internet or on a computer otherwise accessible from the Internet without proper information security precautions.

As shown in FIG. 14, a data breach report list interface may be displayed to a user. The interface comprises a list 1401 of previously-created breach reports 1405, including the name or title 1411 of each data breach report, the status of each report 1412 (e.g., in-progress, scheduled and/or completed) and a number of actions 1413 that may be taken for each report. Such actions may include, but are not limited to, viewing a report 1414; editing report parameters 1415; deleting a report 1416 and/or exporting a custom report 1417 (e.g., a CSV including one or more user-selectable attributes for each data subject affected by a breach, such as email, first name, last name, etc.). The interface further comprises an option to create a new data breach report 1420.

Referring to FIG. 15, a data breach report details screen is illustrated. This screen may be accessed by, for example, selecting the "Create" button 1420 (for new reports) or "Edit" button 1415 (for existing reports) within the breach report list interface. As shown, the breach response report details screen may comprise a user-Tillable form 1501, which allows the user to enter data breach report information, such as but not limited to: a title for the report 1502, a location of one or more data sources to investigate (e.g., database(s) that are known to have been breached and/or data dump file(s) to be investigated), and/or access information for the one or more data sources. In the case of an on-premise or remote database, the location of the database and any necessary access credentials may be entered or selected (e.g., type, geographic location, SMB server 1503, domain name 1504, folders to scan, username 1505, password 1506 and/or access keys). In the case of a data file (e.g., a data dump text file), a path to the file 1507 may be selected and/or entered by the user.

In certain embodiments, the data breach report details screen may allow a user to select or enter search preferences (e.g., a full scan of the data source(s) or a sample scan). If a sample scan is selected, the user may instruct the system to use default sample parameters or may specify custom sample parameters. Upon entering the required information, the user may select a "Run" option 1510 to investigate the data source(s) and generate a breach response report. When the system is instructed to create a data breach report, it runs a scan on the identified data source(s) (as described above); adds an entry to the data breach response report list; and displays the results of this scan to a user via, for example, a data breach exploration screen.

Referring to FIG. 16 an exemplary data breach exploration screen is illustrated. The exploration screen may be accessible via, for example, an "Explore" button (FIG. 14 at 1414) located within the breach response report list screen.

As shown, the data breach exploration screen may display an actual or estimated total number of data subjects 1601 whose personal information was found in a given data breach source 1602 (e.g., a data breach file). In the case of a sample scan, an estimate may be determined by dividing the number of data subjects discovered by the percent of data subjects in the sample.

The data breach exploration screen may further display information relating to the personal information attributes 1610 contained in a given data breach source. As shown, the total number of attributes 1611 and the specific attributes 1612 found may be displayed.

The data breach exploration screen may additionally or alternatively display information pertaining to the systems 1615 affected by a given data breach. For example, the actual or estimated total number of affected systems 1616 may be displayed. In one embodiment, each of the databases and/or files 1617 that include data subject attributes corresponding to attributes found in a data dump file may be shown. This list of systems 1615 may be ordered by the number of data subject identities contained in each system and/or the number of attributes in each system corresponding to those that were found in the data dump file. Additionally or alternatively, the exploration screen may include a breakdown of managed and unmanaged systems 1618.

The data breach exploration screen may additionally or alternatively display information pertaining to the applications affected by a given data breach 1620. For example, the actual or estimated total number of applications 1621 affected by a given data breach may be displayed. In one embodiment, each of the applications 1622 that have access to data subject attributes corresponding to those attributes found in a data dump file may be shown. This list of applications may be ordered by the number of such attributes accessible by each application. Moreover, one or more applications may be tagged as "at-risk" 1623 depending on various factors, including the number of attributes accessible by each application.

Finally, the data breach exploration screen may additionally or alternatively display information pertaining to users 1630 who have access to personal information affected by a given data breach. In one embodiment, each of the users 1631 that have access to data subject attributes corresponding to those attributes found in a data dump file and/or applications that may access such data may be shown. For each user, the system may display the personal information attribute to which the user has access 1632, the data source(s) where such attribute was found 1633 and/or where the attribute is known to exist, a geographic location of such data source(s) 1634, and a risk score relating to the user 1635. This list of users may be ordered by the number of data subject identities and/or at-risk applications to which they have access.

In one alternative embodiment where a data dump file is investigated, the exploration screen may display data subjects that were not discovered in known data sources and/or attributes that were not discovered in known data sources (not shown). In this way, the system may be employed to assist in a determination that a data dump file does not contain personal information of an organization's users.

Figure 17:
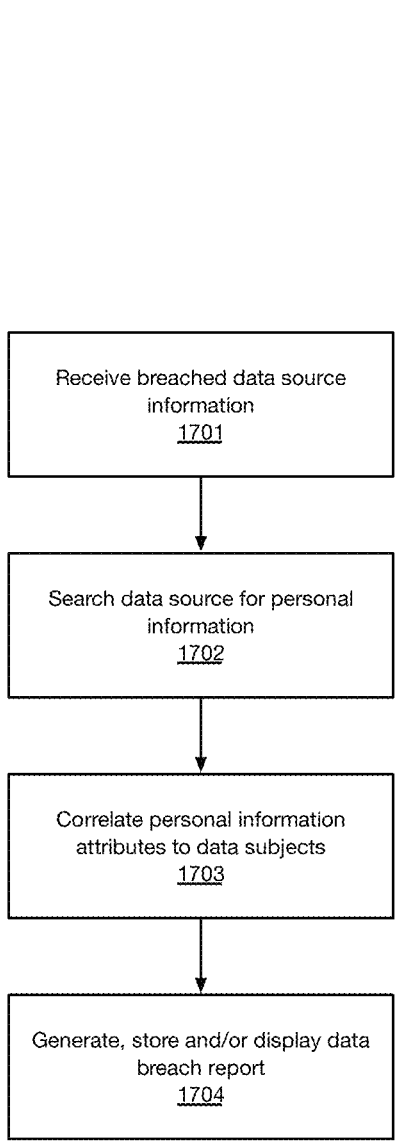
FIG. 17 shows an exemplary method of investigating a potential data breach.

Referring to FIG. 17, an exemplary method of investigating one or more data sources that are known to have been breached is illustrated. In this embodiment, the system may receive data source information 1701 from a user relating to the location and/or access information for the data source(s) that are known to have been breached. The system may then scan the data source(s) 1702 for potential personal information (e.g., data subject attributes) and create a list of personal information findings, as discussed in detail above.

At step 1703, the system attempts to correlate any found personal information attributes to a data subject stored in the identity graph. The system may then generate a data breach report 1704 comprising a list of impacted data subjects and, optionally, any corresponding attributes found in the data source(s). The system may store the report in memory and/or provide the report to a user via a user interface and/or in a downloadable format (e.g., in CSV format).

Figure 18:
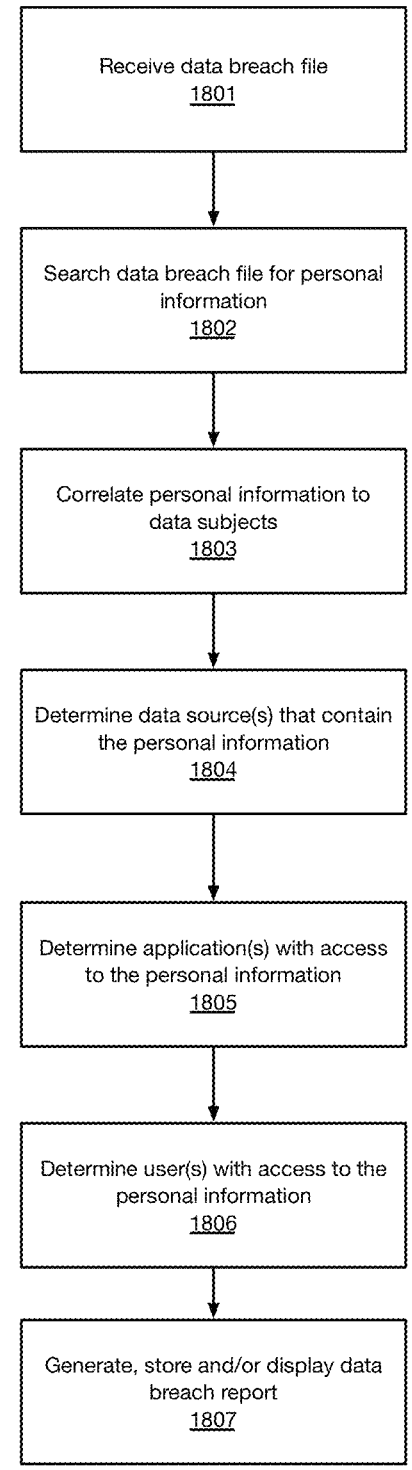
FIG. 18 shows an exemplary method of investigating a data breach file.

Referring to FIG. 18, an exemplary method of investigating a data dump file is illustrated. In this embodiment, the system may be employed to determine: (1) whether a data dump file includes any personal information belonging to an organization's data subjects; (2) one or more data subjects whose personal information is contained in the data dump file; (3) the data sources that store such personal information; (4) the applications that have access to such personal information; and/or (5) any users who have access to such personal information (e.g., via one or more applications).

At step 1801, the system receives a data dump file (also referred to as a data breach file) from a user. The system then conducts a scan of the data dump file 1802 for potential personal information (e.g., data subject attributes) and creates a list of personal information findings, as discussed in detail above.

At step 1803, the system determines data subjects whose personal information is included in the data dump by correlating any personal information findings in the data dump file to data subject profiles stored in the identity graph, as discussed in detail above. The system may then determine one or more data sources that have been breached 1804 by correlating attributes found in the data dump file to the known location(s) of such attributes within an organization's various data sources (such attribute locations are stored in the identity graph). The system may determine one or more applications that have access to the personal information 1805 and/or one or more users who have access to the personal information 1806.

At step 1807, the system generates a data breach report, including any of the information determined in steps 1803-1806. The system may store the report in memory and/or provide the report to a user via a user interface and/or in a downloadable format (e.g., in CSV format).

A user may view the data breach report to understand the extent of any data breach. Moreover, the system may allow a user to take action, such as but not limited to: taking affected systems or applications offline, encrypting or hashing breached data, locking out or otherwise removing a suspicious user's access to one or more systems or applications, opening a task relating to the list of data subjects (e.g., contacting affected data subjects) and/or initiating an investigation (e.g., in SPLUNK or UEBA).

In certain embodiments, the system may determine a point in time when the data breach occurred. For example, the system may compare information stored in a data dump file to a stored snapshot of one or more data sources to identify the snapshot that is most similar to a given data dump. Accordingly, the system may be able to determine an exact date or a range of dates during which the breach occurred (i.e., the date the snapshot was captured).

Additionally or alternatively, the system may identify anomalous activities pertaining to data subjects involved in a breach that are common to most impacted data subjects and distinctively different from non-impacted data subjects. This information may be employed, for example, to determine if one of the data subjects may be responsible for the data breach.

System Architecture

Figure 19:
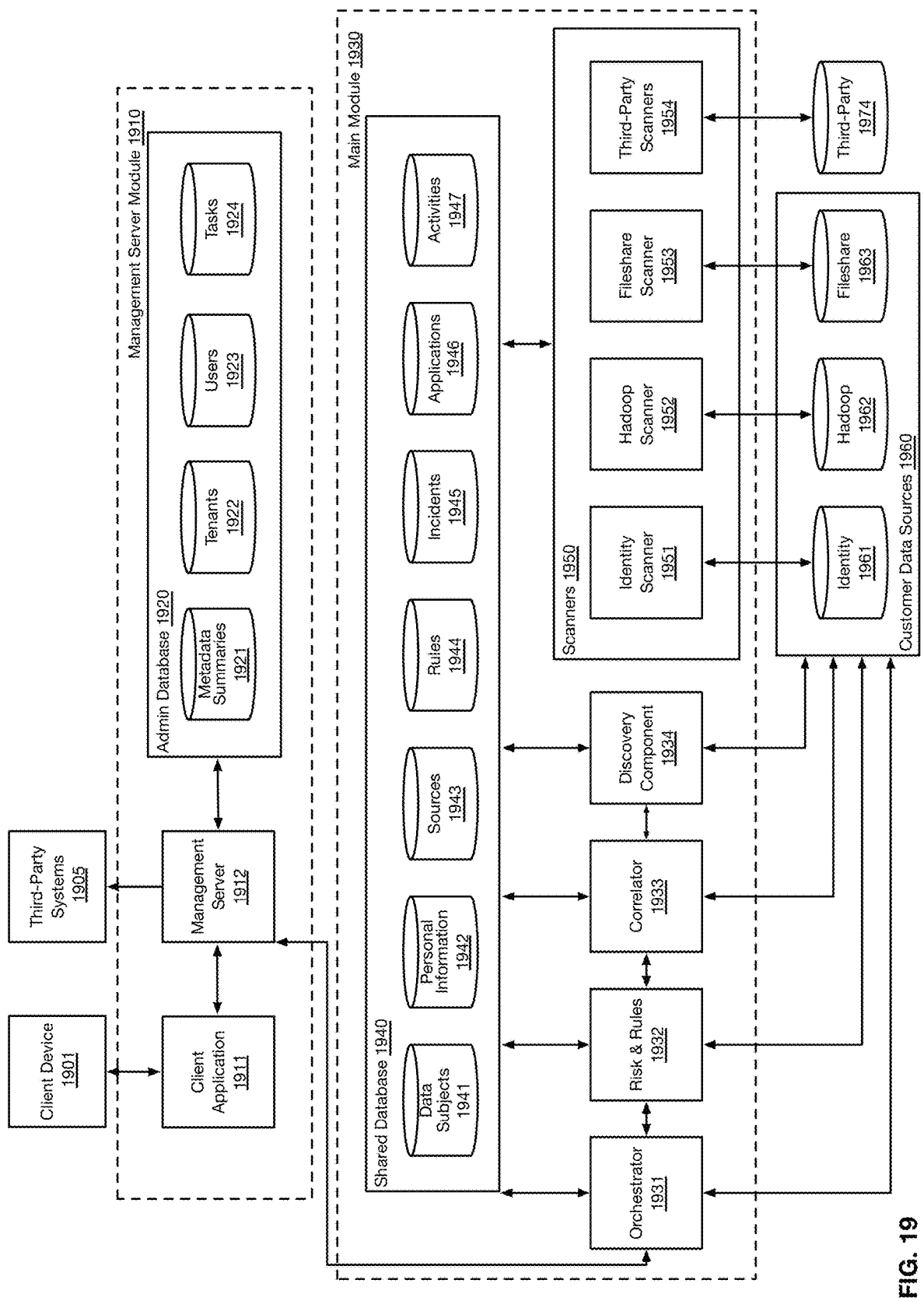
FIG. 19 shows an exemplary system.

Referring to FIG. 19, an exemplary system is illustrated. As shown, the system may comprise a microservices architecture that can be deployed from a public cloud or inside an organization's data center. This architecture allows the system to be deployed as a simple, single-server deployment or as a multitier, hybrid cloud environment comprising one or more on-premise and/or cloud-based applications.

The core system components may be designed as microservices that may be packaged in containers (e.g., DOCKER containers) to facilitate scalability and to allow flexible deployments. When components are decoupled and can each run in their own isolated environment, it is possible to scale the system by adding more instances of relevant microservices. The container images can be managed, version controlled and downloaded from a container hub, or loaded from compressed files in case the organization's environment does not allow hub access. Generally, each of the components may communicate via a REST API (or a message que for asynchronous jobs), and most services may be stateless. It will be appreciated that it is possible for several microservices to share the same container.

Although the system may employ a container service, the core deliverables may still be maintained in plain code (e.g., JavaScript, Java, etc.). Accordingly, the components can be packaged in different virtual machine images or even installed by an installer, if desired or required.

As shown, the system may comprise any number of modules, including but not limited to, a management server module 1910, which can be deployed either in the cloud or on-premise; and a main module 1930 which is typically deployed locally. In one embodiment, the main module 1930 comprises a number of components, such as a shared database component 1940, an orchestrator component 1931, a correlator component 1933, a risk analysis and rules evaluation component 1932, a data source discovery component 1934, and a number of scanner worker components 1950 (e.g., an identity scanner 1951, a Hadoop scanner 1952, a fileshare scanner 1953, and/or a third-party system scanner 1954).

The shared database component 1940 may store information in a number of database tables (1941-1947), such as: a data subjects table 1941, a personal information records table 1942, a data sources table 1943, a rules table 1944, an incidents table 1945, an applications table 1946 and/or an activities table 1947. As shown various components and/or microservices may access the shared database component 1940 to store and/or retrieve information.

In certain embodiments, a data source discovery component 1934 may be employed. The discovery component may be adapted to search for available data sources (e.g., using network discovery). Data source information associated with found data sources may be stored in the shared database 1940 (e.g., in the data sources table 1943).

As shown, the system may comprise a number of distributed, on-premise scanner worker components 1950 that are adapted to scan for and retrieve personal information findings from various data sources 1960, such as identity data sources 1961, primary data sources 1962, secondary sources 1963, and/or third-party data sources 1974. Each of the scanners 1950 may search for personal information in data sources based on one or more personal information rules stored in the shared database 1940 (e.g., in the rules table 1944). Moreover, each of the scanners 1950 may store retrieved personal information in the shared database 1940 (e.g., in the personal information database table 1942). As discussed above, exemplary personal information findings may include an attribute type, an attribute value and/or link, location information and/or a scanner ID. The scan results may also include metadata, such as but not limited to, personal information attributes, number of data subjects, etc., to allow for planning the workload (e.g., to retrieve some or all results for a particular attribute).

In one embodiment, the identity scanner 1951 may connect to one or more of a customer's identity data sources 1961 in order to determine the data subjects for whom identity graph profiles should be maintained by the system. As discussed above, such identity systems 1961 may include one or more structured databases (e.g., SQL), LDAP or other directory systems and/or applications such as CRM systems.

The identity scanner 1951 may connect to the identity system(s), retrieve relevant personal information, and store the results in the shared database component 1940. In certain embodiments, the identity scanner may expose an API to allow for: starting of the scan, checking of the scanner status, and/or retrieving results of a scan.

The primary data source scanner(s) (e.g., Hadoop scanner 1952) connect to an organization's primary data source(s) (e.g., Hadoop system 1962) in order to find personal information, as discussed above. In certain embodiments, the primary data source scanner(s) may expose an API to: start the scan, check status, and/or retrieve results relating to personal information. This scanner may submit a job to run a scan based on values in an input file. And such scanners may store results in the shared database 1940 (e.g., in the personal information table 1942) via the API.

The secondary data source scanner(s) (e.g., fileshare scanner 1953) connect to an organization's secondary data source(s) (e.g., fileshare system 1963) in order to find personal information, as discussed above. In certain embodiments, the secondary data source scanner(s) may expose an API to: start the scan, check status, and/or retrieve results relating to personal information. This scanner may submit a job to run a scan based on values in an input file. And such scanners may store results in the shared database 1940 (e.g., in the personal information table 1942) via the API.

In certain embodiments, the system may integrate with third-party systems and applications 1974, such as data protections systems. A third-party scanner 1954 may be employed to retrieve personal information findings and/or personal information records which can be leverage. Additionally or alternatively, the system may expose an API for third-party systems and applications 1905 to query stored data and/or metadata.

Generally, the system may be configured to scan multiple data sources of multiple types (e.g. Hadoop Server 1, Hadoop Server 2, Fileshare 1, Fileshare 2 and so on). In one embodiment, each type of data source may be scanned by a scanner 1950 specifically adapted to scan that type of data source. In other embodiments, a single scanner may be employed to scan multiple types of data sources.

Each of the scanners 1950 may leverage the target data source's native search capabilities and/or may run as part of the data source. For example, a Hadoop scanner 1951 may run a MapR job, while a SQL scanner (not shown) may run multiple queries (e.g., one for each column in each table, etc.).

Scalability may be achieved by adding more instances of a given scanner, where each scanner can pick up a scanning job and run in parallel to other scanners. Each scanner instance may check the shared database to see whether there are pending jobs ("scanning tasks") for it to take. And, when a scanning task exists, an appropriate scanner may be automatically triggered to perform the scan.

For some scanners, it may be desirable to achieve parallelism by splitting the work into separate scans. For example each personal information attribute may be separated to a different scan (e.g., a first scan may search for social security numbers and a second scan may search for full names). As another example, scans may be separated by alphabetical splitting (e.g., a first scan may search for full names beginning with letters a-f and a second scan may search for full names beginning with letters g-z). For certain scanners (e.g. Hadoop scanner 1951) the system's native parallelism may be exploited.

In one embodiment, the system may comprise an orchestrator component 1931 adapted to call and coordinate separate handlers and/or microservices. For example, the orchestrator component may interact with scanner components 1950, the correlator 1933, the risk and rules component 1932, data sources 1960, the shared database component 1940 and/or the management server component 1912. Generally, the orchestrator component 1931 receives information relating to a data subject's personal information and prepares the information for the scanners 1950 (e.g., via input files). It may also trigger the scanners and, upon completion, retrieve the results and transmit the same to the shared database component with additional metadata.

The orchestrator component 1931 may be responsible for one or more of the following: providing configuration data for the scanners 1950 (via input from a user); scheduling the scans, refreshes etc.; executing correlation logic to match between personal information findings and actual identities (e.g., based on personal information rules); executing static risk analysis on the inventory and updating the relevant risk scores; executing rule evaluation on the inventory and generating violations; and/or running business information processing (e.g. summary, aggregation, etc. required for the dashboards). In certain embodiments, the orchestrator 1931 may generate metadata summaries and/or upload the same to the management server component 1912. The orchestrator component 1931 can also run further processing, such as risk calculations and compliance determinations.

An exemplary orchestrator workflow may include the following steps: (1) run scan of identity source(s); (2) check when finished; (3) prepare a given scanner launch by retrieving, from the correlator component 1933, a list of attribute values to scan and creating an input file with the values; (4) run the given scanner 1950 with the input file; (5) determine that the scanner has completed the scan; and (6) call the correlator component to create personal information records from the scan results. Depending on specific requirements and/or constraints of any of the scanners, results may be written directly to the shared database 1940 such that the orchestrator component can read the results directly when the scan is complete.

The correlator component 1933 may be employed to define personal information and correlate any personal information findings to corresponding data subjects. The correlator component 1933 may be responsible for one or more of the following: (1) determining, retrieving, and/or updating personal information rule (e.g., stored in the rules table 1944 in the shared database 1940; (2) providing a list of searchable values to be used as input for the scanners 1950, based on the personal information rules; (3) searching for a matching data subject, upon receiving personal information findings from one or more scanners; and (4) when a match is found, creating a personal information record, including data subject name, unique data subject ID, attribute name, data source, and/or data link and storing the same in the shared database 1940 (e.g., in the personal information table 1942 and/or the data subjects table 1941).

It will be appreciated that personal information findings, as well as the personal information attributes received from the identity scanners, may include sensitive values. Where possible, the system may only store hashed values of such attributes. Where not possible, all temporary data kept for correlation may be wiped after it completes, as all other places in the system need only to hold/use a pointer to the data and not the actual values.

In certain embodiments, the system may further comprise a risk and rules component 1932 that provides activity information relating to data sources 1960, including but not limited to, applications, accounts, and/or personal information records that are used or accessed. Such activity data may be determined via STEM, digital asset management ("DAM") and/or cloud access security broker ("CASB") products. And such data may be stored in the shared database (e.g., in the activities table 1947).

The risk and rules component 1932 may be further adapted to calculate risk scores for each personal information record. As discussed above, risk may additionally or alternatively be calculated for one or more of the following: users, data subjects, personal information attributes, systems and/or an entire organization. Such calculations may be based on static parameters, such as personal information attributes and weights, and/or dynamic parameters, such as frequency of use and type of access (e.g., read/write, etc.).

The risk and rules component may further be employed to review personal information records based on predetermined, learned and/or user-created compliance regulations/rules (e.g., users from Germany must have their data stored in Germany). This component may be designed to report rule violations and/or to allow such rule violations in certain cases.

Still referring to FIG. 19, the system further comprises a cloud-based management server module 1910. This module comprises a number of components, including an administrative database component 1920, a management server 1912, and a client application component 1911.

The administrative database component 1920 may store information in a number of database tables (1921-1924), such as a metadata summaries table 1921, a tenants information table 1922, a users table 1923 and/or a tasks table 1924. As shown various components and/or microservices may access the administrative database component 1920 to store and/or retrieve information.

The system may further comprise a client application 1911 to display information in graphical format to any number of users. The client application 1911 may comprise a multi-tenant, web-based application (e.g., using AngularJS) that runs on a web browser of a client device 1901. As discussed above, the client application may allow for the management and protection of personal information through the remote management of the on-premise elements of the different tenants. The client application 1911 may comprise a SaaS distributed application packaged in containers and remotely hosted to allow simple porting to be delivered as an on-premise, private-cloud application.

In certain embodiments, a user may access the client application to perform customer registration activities. For example, the client application may allow the user to download and register on-premise elements; setup and manage personal information discovery tasks; perform software updates to self-service elements; monitor system health; and/or access any of the above described dashboards and features of the platform.

Although not shown, in certain embodiments, an analytics and configuration component may be employed to provide the backend for an API consumed by one or more user interface screens of the client application. This component may send instructions to the main module 1930 by adding activities, such as activities polled by the main module.

Figure 20:
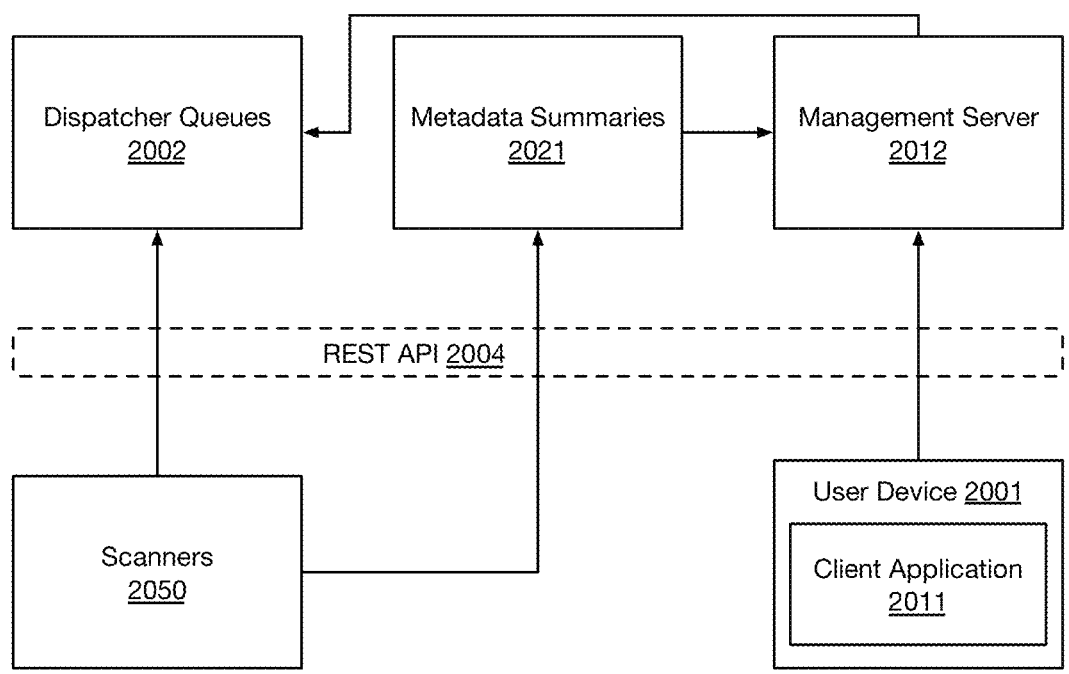
FIG. 20 shows an exemplary data flow diagram.

Referring to FIG. 20, an exemplary data flow diagram is illustrated. As shown, in one embodiment, a client application 2011 running on a client device 2001 (e.g., via a browser or browser-like application) may communicate with the management server 2012 through a set of REST APIs 2004. In this embodiment, all graphical user interface ("GUI") commands may be dispatched through a dispatcher queue 2002 and may be polled by system components to rely only on outgoing calls from the on-premise components. This avoids the need for any ports opened on a firewall.

All statistics and metadata regarding scans and/or the health of the system produced by the scanners 2050 may be stored on a metadata summaries cache database 2021 on the server side to allow for a responsive user experience. In one embodiment, only metadata summaries may be uploaded to the management server 2012 so that personal information does not reach the server. Accordingly, such metadata summaries may be stored only in the cloud.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD-ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a front end component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer-implemented method of locating personal information in a plurality of data sources and correlating the personal information to one or more data subjects, the method comprising:
   storing, by a computer, an identity graph comprising a plurality of data subject profiles, the identity graph comprising:
      a first attribute field comprising first attribute values, each associated with one of the data subject profiles; and
      a second attribute field comprising second attribute values, each associated with one of the data subject profiles;
   calculating, by the computer, a first identifiability score for the first attribute field, said calculating comprising:
      determining an average number of data subject profiles associated with each of the first attribute values,
      wherein the first identifiability score meets a minimum identifiability score;
   calculating, by the computer, a second identifiability score for the second attribute field, said calculating comprising:
      determining an average number of data subject profiles associated with each of the second attribute values,
      wherein the second identifiability score does not meet the minimum identifiability score;
   searching, by the computer, a scanned data source comprising scanned values;
   determining, by the computer, a plurality of personal information findings comprising:
      a first set of personal information findings determined by comparing the first attribute values to the scanned values; and
      a second set of personal information findings determined by comparing the second attribute values to the scanned values;
   correlating, by the computer, the first set of personal information findings, but not the second set of personal information findings, to the data subjects;
   creating, by the computer, personal information records corresponding to the correlated personal information findings and the data subject profiles;
   associating, by the computer, the personal information records with the data subject profiles; and
   providing, by the computer, the data subject profiles to a user.

2. A computer-implemented method according to claim 1, wherein the scanned values are located at a first location within the scanned data source and the method further comprises:
   searching, by the computer, a second location of the scanned data source for personal information, based on one or more proximity rules;
   determining, by the computer, a second plurality of personal information findings in the second location of the scanned data source;
   correlating, by the computer, some or all of the second plurality of personal information findings to the data subjects;
   creating, by the computer, second personal information records corresponding to the correlated second personal information findings; and
   associating, by the computer, the second personal information records with the data subject profiles.

3. A computer-implemented method according to claim 2, wherein the second location is located within a proximity of the first location.

4. A computer-implemented method according to claim 2 further comprising:
   updating, by the computer, one or more of the proximity rules, based on the second personal information records; and
   searching, by the computer, based on one or more of the updated proximity rules, a third location of the scanned data source.

5. A computer-implemented method according to claim 1 further comprising:
   updating, by the computer, the first and second identifiability scores based on the personal information records.

6. A computer-implemented method according to claim 1 further comprising:
   determining, by the computer, that at least one of the first set of personal information findings constitutes a false positive finding,
      wherein, based on the determination, a personal information record is not created for the false positive finding.

7. A computer-implemented method according to claim 1, wherein each of the personal information records comprises metadata associated with the respective, corresponding personal information finding, the metadata selected from the group consisting of: an attribute type, an attribute value, a data source, a location within the data source and a data subject.

8. A computer-implemented method according to claim 7, wherein the attribute type associated with the personal information records is selected from the group consisting of: a name, a social security number, a phone number, an address, an email address, a license number, a passport number, a credit card number, a username, a date of birth, personal health information, educational information and combinations thereof.

9. A computer-implemented method according to claim 1, wherein the identity graph is crated from an identity data source.

10. A computer-implemented method according to claim 9, wherein the scanned data source is a primary or secondary data source.

11. A computer-implemented method according to claim 1, wherein the minimum identifiability score is received from a user.

12. A computer-implemented method according to claim 1 further comprising:
- calculating, by the computer, a record risk score for each of the personal information records;
- calculating, by the computer, a data subject risk score for each of the data subject profiles, based on the record risk scores; and
- associating, by the computer, the data subject risk scores with the data subject profiles.

13. A computer-implemented method according to claim 12 further comprising:
- calculating, by the computer, a data source risk score for the scanned data source;
- calculating, by the computer, an aggregate risk score, based on the record risk scores, the data subject risk scores and the data source risk scores; and
- providing the aggregate risk score to the user.

14. A computer-implemented method according to claim 1 further comprising:
- monitoring, by the computer, the scanned data source;
- determining, by the computer, that an activity relating to the scanned values has occurred;
- determining, by the computer, that the activity violates one or more compliance rules; and
- providing a notification to the user relating to the activity.

15. A system comprising one or more computers and one or more storage devices storing instructions that when executed by the one or more computers cause the one or more computers to perform operations comprising:
- storing an identity graph comprising a plurality of data subject profiles, the identity graph comprising:
  - a first attribute field comprising first attribute values, each associated with one of the data subject profiles; and
  - a second attribute field comprising second attribute values, each associated with one of the data subject profiles;
- calculating a first identifiability score for the first attribute field, said calculating comprising:
  - determining an average number of data subject profiles associated with each of the first attribute values,
  - wherein the first identifiability score meets a minimum identifiability score;
- calculating a second identifiability score for the second attribute field, said calculating comprising:
  - determining an average number of data subject profiles associated with each of the second attribute values,
  - wherein the second identifiability score does not meet the minimum identifiability score;
- searching a scanned data source comprising scanned values;
- determining a plurality of personal information findings comprising:
  - a first set of personal information findings determined by comparing the first attribute values to the scanned values; and
  - a second set of personal information findings determined by comparing the second attribute values to the scanned values;
- correlating the first set of personal information findings, but not the second set of personal information findings, to the data subjects;
- creating personal information records corresponding to the correlated personal information findings and the data subject profiles;
- associating the personal information records with the data subject profiles; and
- providing the data subject profiles to a user.

16. A system according to claim 15, wherein the one or more operations further comprise:
- calculating a record risk score for each of the personal information records;
- calculating a data subject risk score for each of the data subject profiles, based on the record risk scores; and
- associating the data subject risk scores with the data subject profiles.

17. A system according to claim 15, wherein the one or more operations further comprise:
- monitoring the scanned data source;
- determining that an activity relating to the scanned values has occurred;
- determining that the activity violates one or more compliance rules; and
- providing a notification to the user relating to the activity.

18. A system according to claim 17, wherein the compliance rules are based on one or more of: an attribute type, an attribute location, data subject consent, data subject residency, user access privileges, application type, application location, application privileges, activity type and an activity pattern.

* * * * *